United States Patent Office 3,597,391
Patented Aug. 3, 1971

3,597,391
AROMATIC POLYAMIDE IMINES, NOVEL N-ARYL SUBSTITUTED - POLYBENZIMIDAZOLES DERIVED THEREFROM, AND PROCESS FOR PREPARATION THEREOF
Shigeyoshi Hara, Moriya Uchida, and Masao Senoo, Tokyo, Japan, assignors to Teijn Limited, Osaka, Japan
No Drawing. Filed Sept. 6, 1968, Ser. No. 758,113
Claims priority, application Japan, Sept. 11, 1967, 42/58,253; Sept. 16, 1967, 42/59,277; Oct. 19, 1967, 42/67,420, 42/67,421
Int. Cl. C08g 33/02, 33/06
U.S. Cl. 260—47
22 Claims

ABSTRACT OF THE DISCLOSURE

A process for preparing a polyamide imine and a heat-stable polybenzimidazole which comprises reacting an aromatic triamine such as 2,4'-diaminodiphenylamine wherein two amino groups are attached to ortho-positions of an aromatic ring, or an aromatic tetramine such as N,N'-bis-(2 - aminophenyl-p-phenylenediamine) wherein each two amino groups are attached to ortho positions of each separate aromatic ring, with an aromatic dicarboxylic halide to form a polyamide imine which is soluble in a normal organic solvent, and heating or chemically treating said polyamide imine to convert it into a heat stable polybenzimidazole.

---

This invention relates to novel aromatic polyamide imines, novel N-aryl substituted polybenzimidazoles derived therefrom, and to processes for preparation thereof.

It has been known to obtain linear high-molecular-weight polyamides by polycondensation between aromatic diamines and dicarboxylic acid halides. When, however, aromatic polyamines having at least 3 primary and/or secondary amino groups are used instead of the diamines, solvent-soluble high-molecular-weight polymers cannot be obtained by reaction of such polyamines and dicarboxylic acid halides, but usually cross-linked, solvent-insoluble, polymers result.

For instance, a polymer prepared by reacting 4,4'-diaminodiphenylamine of the following formula

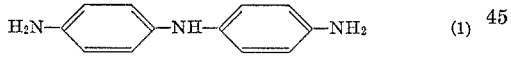
(1)

with isophthaloyl chloride of the following formula

(2)

is not soluble in any solvent, and apparently contains a cross-linked structure. The reason is that not only the two primary amino groups but also the secondary amino group (—NH—) of the 4,4'-diaminodiphenylamine is reactive with the isophthaloyl chloride. The reactivity of the secondary amino group (—NH—) of 4,4'-diaminodiphenylamine with an aromatic dicarboxylic acid chloride can be easily seen from the following reaction Formula 1 where the reaction of diphenylamine with benzoyl chloride gives N-benzoyldiphenylamine [Ann. 132, 166 (1864) and Ann. 244, 12, Anm. (1884)].

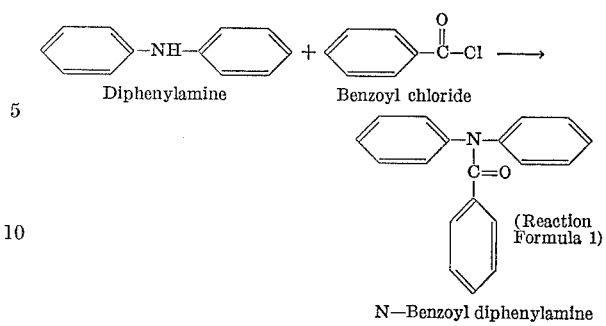

N—Benzoyl diphenylamine

The reaction of 4-aminodiphenylamine with benzoyl chloride gives N,N'-dibenzoyl-p-aminodiphenylamine in accordance with the following reaction Formula 2 [Ber. 35, 1971 (1902)].

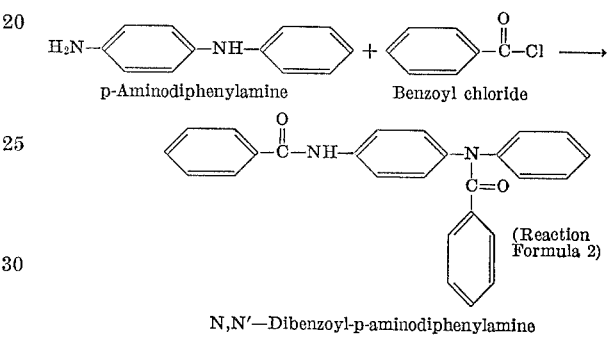

N,N'—Dibenzoyl-p-aminodiphenylamine

A previous example of reaction of an aromatic tetramine with a dicarboxylic acid dihalide with a view to obtaining a precursor of polybenizimidazole is found in H. Vogel and C. S. Marvel, "Journal of Polymer Science," 50, 528 (1961) where 3,3'-diaminobenzidine or 1,2,4,5-tetraaminobenzene and an aromatic dicarboxylic acid chloride are subjected to interfacial polycondensation.

3-3'-diaminobenzidine

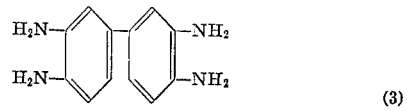

1,2,4,5-tetraaminobenzene

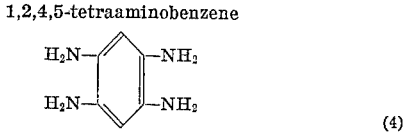

This example gave polyamide amines of rather low molecular weight whose inherent viscosities measured at 0.2% polymer concentration in sulfuric acid ranges from 0.09 to 0.22. These polyamide amines were soluble only in sulfuric acid and insoluble in any organic solvent, even when the inherent viscosity of the polymers was so low as 0.09.

Our research work has revealed however that a polyamide imine (to be referred to as aromatic polyamide imine hereinafter) wherein at least 50 mol percent of the entire structural unit is composed of at least one aromatic amide imine unit expressed by the following general formula

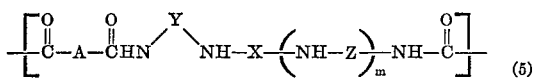

wherein Y and Z may be the same or different and each represent an ortho-oriented divalent aromatic group; X represents a divalent aromatic group other than those ortho- and peri-oriented; A represents at least one divalent aromatic group; the two

groups should not be at ortho- or peri-positions to the aromatic group A; and $m$ is 0 or 1, is soluble in amide-type organic solvents such as N,N-dimethylacetamide, N,N-dimethyl formamide, 1-methyl-2-pyrrolidone, 1,5-dimethyl-2-pyrrolidone and hexamethyl phosphoramide or an ordinary organic solvent such as dimethyl sulfoxide, epsilon-caprolactam and m-cresol even when it has a high molecular weight suitable for shaping into films and other articles, and therefore it is easy to fabricate. It has also been found that this aromatic polyamide imine is easily cyclo-dehydrated by application of heat, and gives an N-aryl substituted polybenzimidazole which is very stable to heat and chemicals.

The aromatic polyamide imine of the invention can be prepared, for instance, by polycondensing a specific aromatic triamine or tetramine (A) with an aromatic dicarboxylic acid dihalide (C) in an inert organic liquid medium. In this case, a modified polymer may be obtained by replacing as much as 50 mol percent of said triamine or tetramine with a diamine (B).

Now, the preparation of the aromatic polyamide imine of the invention will be described in more detail.

According to the invention, the aromatic polyamide imine is produced by reacting (1) at least one aromatic triamine or tetramine (A) of the following formula

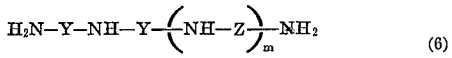

wherein Y and Z may be the same or different and each represent an ortho-oriented divalent aromatic group; X represents a divalent aromatic group other than those ortho- and peri-oriented; $m$ is 0 or 1, o r(2) a mixture of at least 30 mol percent of the said aromatic triamine or tetramine with less than 50 mol percent of a diamine (B), with (3) at least one aromatic dicarboxylic acid dihalide (C) expressed by the general formula Hal·OC—A—CO·Hal (7)

wherein Hal is a halogen atom,
A is a divalent aromtic group, and
two —CO·Hal groups should not be at otho- or peri-positions to the aromatic nucleus of A in an inert organic liquid medium.

It should be noted that the term "ortho-position" used in the present specification and claims means an adjacent position of an aromatic nucleus such as benzene, naphthalene and hetrocyclic nucleus, and the "peri-position" used in the specification and claims means the peri-position of a naphthalene nucleus and a position corresponding to the peri position of naphthalene nucleus of a cyclic compound having a structure analogous to a naphthalene nucleus.

By reacting the aromatic triamine or tetramine (A) in which one or two N-aryl substituted secondary amino groups are attached at a nuclear carbon atom adjacent to a nuclear carbon atom to which a primary amino group is bonded, with the aromatic dicarboxylic acid dihalide (C), said secondary amino groups do not react with carbonyl halide of the aromatic dicarboxylic acid dihalide, and therefore, a substantially linear aromatic polyamide imine containing the secondary amino groups in their original form will be formed. It is for this reason that the aromatic polyamide imine of this invention is soluble in many organic solvents. Furthermore, by application of heat, etc., to such aromatic polyamide imine, it is possible to induce a cyclodehydration reaction between the secondary amino group and the carboimino group. Consequently, more thermally and chemically stable polybenizimidazole is formed. It has not been known at all heretofore that the use of the aromatic triamine or tetramine to be used in this invention can lead to the formation of the polyamide imine soluble in an organic solvent, and that the additional stage of cyclo-dehydration of the polyamide imine makes it possible to convert it into polybenzimidazole. By so doing, the degree of polymerization and that of cyclization can be regulated optionally and easily.

The invention will be further described below in greater detail in the following order.

(1) Aromatic triamine or tetramine (starting material A)
(2) Diamine (optional starting material B)
(3) Aromatic dicarboxylic acid dihalide (starting material C)
(4) Process for preparation of the aromatic polyamide imine of the invention
(5) Structure and properties of the aromatic polyamide imine of the invention
(6) Process for preparation of polybenzimidazole of the invention from the aromatic polyamide imine, together with the properties of the polybenzimidazole

AROMATIC TRIAMINE OR TETRAMINE

The aromatic triamine or tetrame (A) of the invention is expressed by the following general Formula 6

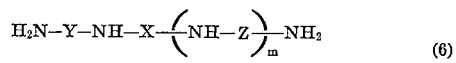

wherein Y and Z may be the same or different and each represent an ortho-oriented aromatic group; X represents a divalent aromatic group other than those ortho- and peri-oriented; and $m$ is 0 or 1. When $m$ is 0, therefore, the above Formula 6 is described as the Formula 8

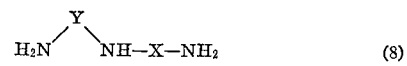

wherein X and Y have the same meanings as described above, which expresses the aromatic triamine used in the invention. When $m$ is 1, the above Formula 6 is given as

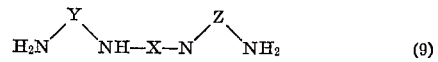

wherein X, Y and Z are the same as defined above, which formula expresses the aromatic tetramine used in the invention. As already defined, in the above Formulae 8 and 9, —NH$_2$ group and —NH— group bonded to Y or to both Y and Z are bonded to carbon atoms of an aromatic nucleus which are ortho to each other, and —NH— group and —NH$_2$ group or two —NH— groups attached to the aromatic group X are bonded to nuclear carbons at position other than the ortho and peri positions of the group X to each other.

Preferable as such aromatic triamine or tetramine are compounds expressed by the following Formula 10

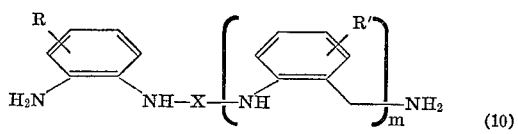

wherein X represents a divalent aromatic group other than those ortho- and peri-oriented which is selected from the group consisting of a benzene nucleus, biphenyl nucleus, naphthalene nucleus, and an aromatic group expressed by the formula

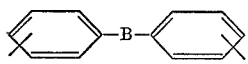

wherein B is an alkylene group having 1–3 carbon atoms, —O—, —SO$_2$— or $$-\overset{O}{\underset{}{C}}-$$

R and R' may be the same or different and each represent a hydrogen atom, a lower aliphatic hydrocarbon group having 1–3 carbon atoms, or either R"O— or R'"OCO—, wherein R" or R'" is a lower alkyl group having 1–3 carbon atoms or a phenyl group; and $m$ is 0 or 1.

Examples of the aromatic triamines or tetramines of the invention expressed by the above Formulae 6, 8, 9 and 10 are given below. It should be understood that these examples are presented for the purpose of facilitating the understanding of the invention, and the invention is in no way limited by them.

(1) In the case of $m=0$ in the Formula 10:

(101)
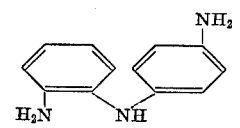
2,4'-Diaminodiphenylamine (102)
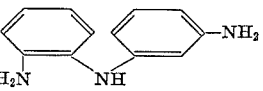
2,3'-Diaminodiphenylamine (103)
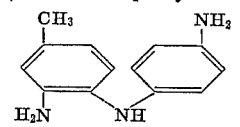
4-Methyl-2,4'-diaminodiphenylamine (104)
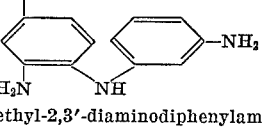
4-Methyl-2,3'-diaminodiphenylamine (105)
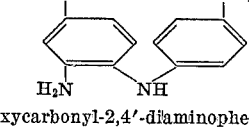
4-Methoxycarbonyl-2,4'-diaminophenylamine (106)
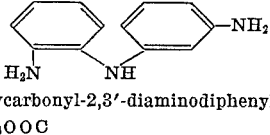
4-Methoxycarbonyl-2,3'-diaminodiphenylamine (107)
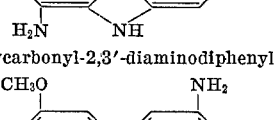
4-Phenoxycarbonyl-2,3'-diaminodiphenylamine (108)
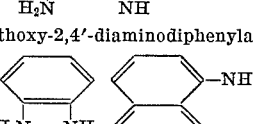
4-Methoxy-2,4'-diaminodiphenylamine (109)
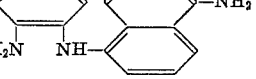
1-(2-Aminoanilino)-5-amino-naphthalene (110)
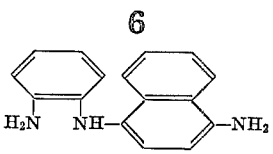
1-(2-Aminoanilino)-4-amino-naphthalene (111)
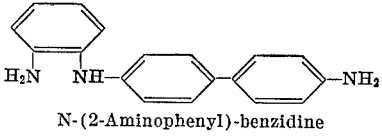
N-(2-Aminophenyl)-benzidine (112)
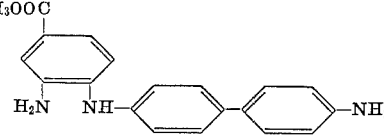
N-(4-Methoxycarbonyl-2-aminophenyl)-benzidine (113)
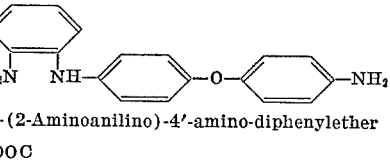
4-(2-Aminoanilino)-4'-amino-diphenylether (114)
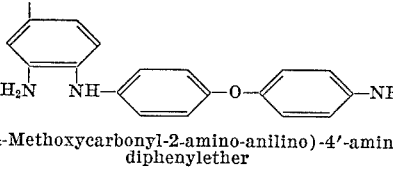
4-(4-Methoxycarbonyl-2-amino-anilino)-4'-amino-diphenylether (115)
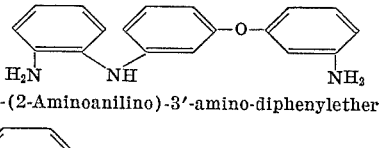
3-(2-Aminoanilino)-3'-amino-diphenylether (116)
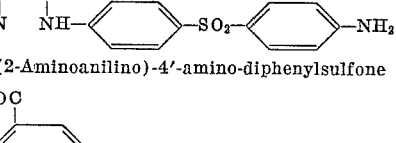
4-(2-Aminoanilino)-4'-amino-diphenylsulfone (117)
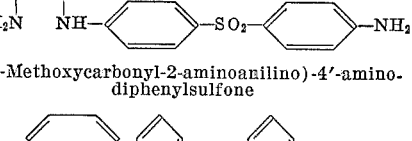
4-(4-Methoxycarbonyl-2-aminoanilino)-4'-amino-diphenylsulfone (118)
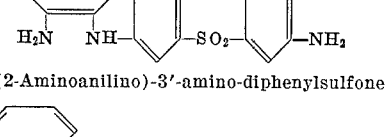
3-(2-Aminoanilino)-3'-amino-diphenylsulfone (119)
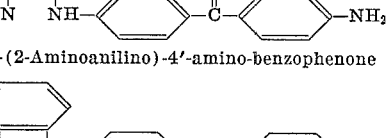
4-(2-Aminoanilino)-4'-amino-benzophenone (120)
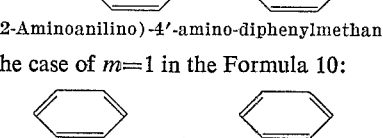
4-(2-Aminoanilino)-4'-amino-diphenylmethane (2) In the case of $m=1$ in the Formula 10:

(121)
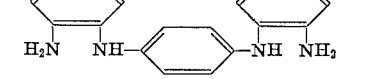
N,N'-Bis(2-aminophenyl-p-phenylenediamine (122) 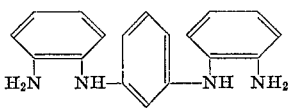
N,N'-Bis(2-aminophenyl)-m-phenylenediamine (123) 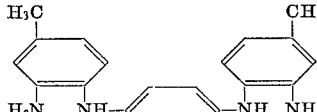
N,N'-Bis(4-methyl-2-aminophenyl)-p-phenylenediamine (124) 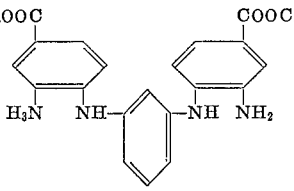
N,N'-Bis(4-methoxycarbonyl-2-aminophenyl)-m-phenylenediamine (125) 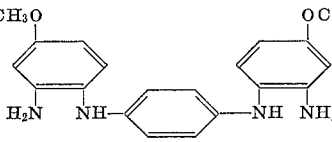
N,N'-Bis(4-methoxy-2-aminophenyl)-p-phenylenediamine (126) 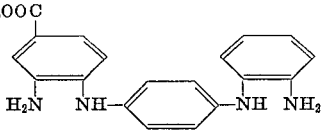
N-(4-Methoxycarbonyl-2-aminophenyl)-N'-(2-aminophenyl)-p-phenylenediamine (127) 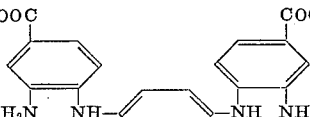
N,N'-Bis(4-Methoxycarbonyl-2-aminophenyl)-p-phenylenediamine (128) 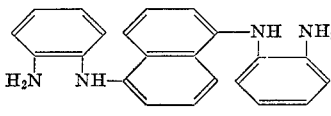
1,5-Bis(2-aminoanilino)-naphthalene (129) 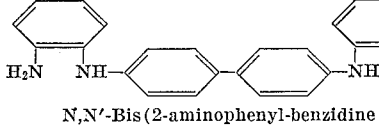
N,N'-Bis(2-aminophenyl-benzidine (130) 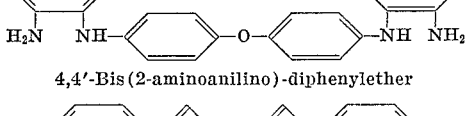
4,4'-Bis(2-aminoanilino)-diphenylether (131) 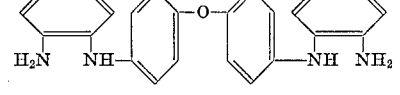
3,3'-Bis(2-aminoanilino)-diphenylether (132) 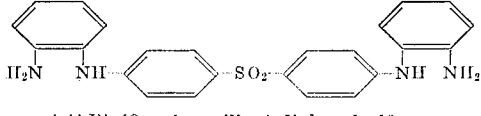
4,4'-Bis(2-aminoanilino)-diphenylsulfone (133) 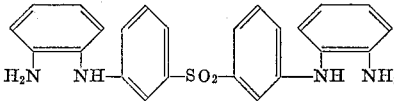
3,3'-Bis(2-aminoanilino)-diphenylsulfone (134) 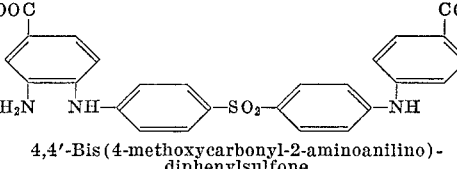
4,4'-Bis(4-methoxycarbonyl-2-aminoanilino)-diphenylsulfone (135) 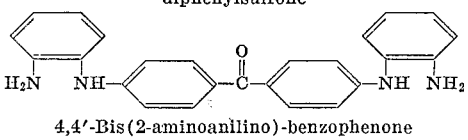
4,4'-Bis(2-aminoanilino)-benzophenone (136) 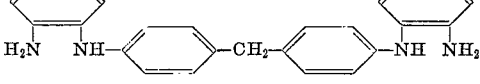
4,4'-Bis(2-aminoanilino)-diphenylmethane (137) 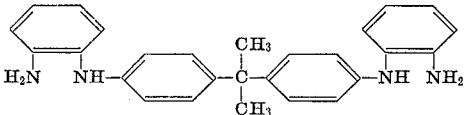
2,2-Bis[4-(2-aminoanilino)-phenyl]propane (3) In the case of $m=0$ in the Formula 6 triamine expressed by the Formula 8:

(138) 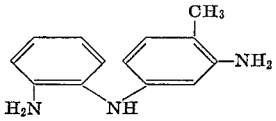
4'-Methyl-2,3'-diaminodiphenylamine (139) 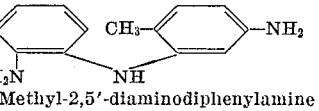
2'-Methyl-2,5'-diaminodiphenylamine (140) 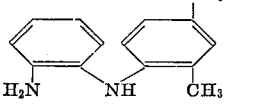
2'-Methyl-2,4'-diaminodiphenylamine (141) 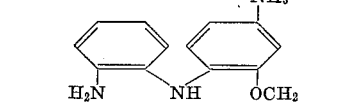
2'-Methoxy-2,4'-diaminophenylamine (142) 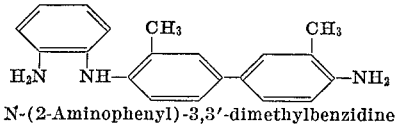
N-(2-Aminophenyl)-3,3'-dimethylbenzidine (143) 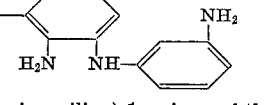
2-(4-Aminoanilino)-1-aminonaphthalene (144) 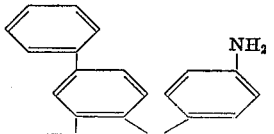
4-(4-Aminoanilino)-3-aminodiphenyl

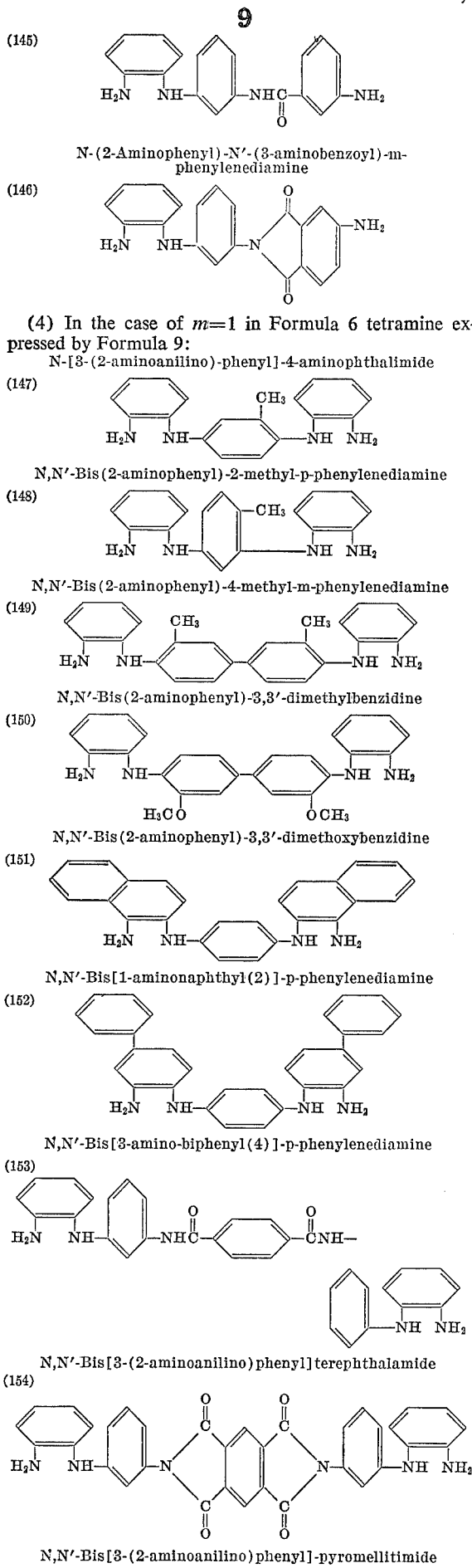

(145) N-(2-Aminophenyl)-N'-(3-aminobenzoyl)-m-phenylenediamine (146)

(4) In the case of m=1 in Formula 6 tetramine expressed by Formula 9:
N-[3-(2-aminoanilino)-phenyl]-4-aminophthalimide (147) N,N'-Bis(2-aminophenyl)-2-methyl-p-phenylenediamine (148) N,N'-Bis(2-aminophenyl)-4-methyl-m-phenylenediamine (149) N,N'-Bis(2-aminophenyl)-3,3'-dimethylbenzidine (150) N,N'-Bis(2-aminophenyl)-3,3'-dimethoxybenzidine (151) N,N'-Bis[1-aminonaphthyl(2)]-p-phenylenediamine (152) N,N'-Bis[3-amino-biphenyl(4)]-p-phenylenediamine (153) N,N'-Bis[3-(2-aminoanilino)phenyl]terephthalamide (154) N,N'-Bis[3-(2-aminoanilino)phenyl]-pyromellitimide

DIAMINES

In the present invention, the aromatic polyamide imine obtained by reaction of the aromatic triamine or aromatic tetramine of the Formula 6, 8, 9 or 10 with the aromatic dicarboxylic acid dihalide of the Formula 7 may be modified by replacing 50 mol percent or less of the aromatic triamine or tetramine (A) with a diamine (B) which will be mentioned below. When the aromatic polyamide imine is modified in this manner with a diamine, the resulting modified polyamide imine and polybenzimidazole obtained by its cyclo-dehydration are improved in mechanical properties such as tenacity, flexibility and elongation, although not showing particular improvements in thermal resistance. Aromatic diamines are preferable as such a modifier, but aliphatic or alicyclic diamines are also usable.

Such aromatic diamines are expressed by the following formulae, for instance.

$$\underset{\alpha}{HN}-Q-\underset{\beta}{NH} \quad (11)$$

wherein Q is a divalent aromatic group;

$$\underset{\alpha}{HN-} \text{ group and } \underset{\beta}{-NH}$$

group are bonded to nuclear carbon atoms at positions other than those adjacent or peri to the aromatic group Q: and, α and β are the same or different and represent an alkyl group having 1–3 carbon atoms or a hydrogen atom.

Among such aromatic diamines, especially preferable are compounds expressed by the following Formula 12

$$\underset{\alpha}{HN}-Q'-\underset{\beta}{NH} \quad (12)$$

wherein Q' is at least one aromatic group selected from the group consisting of a phenylene group, biphenylene group, naphthylene group and

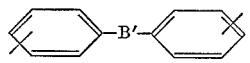

wherein B' is an alkylene group having 1–3 carbon atoms, —O—, —S—, —SO$_2$— or $$-\underset{\|}{\overset{O}{C}}-$$

α and β are the same or different and represent a hydrogen atom or a methyl group; and $$\underset{\alpha}{HN-} \text{ group and } \underset{\beta}{-NH}$$

group are bonded to nuclear carbon atoms of the aromatic group Q' at positions other than adjacent or peri positions.

Aliphatic diamines or alicyclic diamines are also usable. The usable aliphatic diamines have a structure wherein two amine groups are spaced by at least three carbon atoms, and should preferably have 3–10 carbon atoms in total. Any alicyclic diamines are usable so long as they have a structure wherein two amino groups are spaced by at least four carbon atoms with the exception of piperazine.

Examples of the diamines usable as modifiers are the following compounds.

(201) 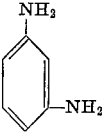

m-Phenylenediamine (202) 4-Methyl-m-phenylenediamine (203) 3-Ethyl-m-phenylenediamine (204) 4-Chloro-m-phenylenediamine (205) 4,6-Dimethyl-m-phenylenediamine (206) p-Phenylenediamine (207) N-Methyl-p-phenylenediamine (208) Benzidine (209) 3,3'-Dimethylbenzidine (210) 3,3'-Dichlorobenzidine (211) 3,3'-Dimethoxybenzidine (212) 2,2-Bis(4-aminophenyl)propane (213) 4,4'-Diaminodiphenylmethane (214) 3,3'-Dichloro-4,4'-diaminodiphenylmethane (215) Bis(4-N-methylaminophenyl)methane (216) 4,4'-Diaminodiphenylether (217) 4,4'-Diaminodiphenylsulfide (218) 4,4'-Diaminodiphenylsulfone (219) 3,3'-Diaminodiphenylsulfone (220) 4,4'-Diaminobenzophenone (221) 3,3'-Diaminobenzophenone (222) 1,5-Diaminonaphthalene (223) Bis(4-aminophenyl)diphenylsilane (224) Bis(4-aminophenyl)-methylamine (225) Bis(4-aminophenyl)phenylphosphineoxide (226) 2,6-Diaminopyridine (227) 4,4'-Diaminodicyclohexylmethane (228) 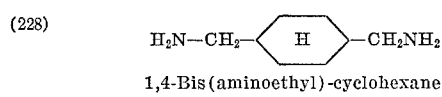
1,4-Bis(aminoethyl)-cyclohexane (229) 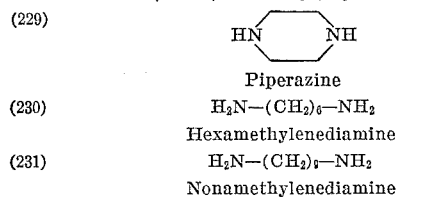
Piperazine (230) H₂N—(CH₂)₆—NH₂
Hexamethylenediamine (231) H₂N—(CH₂)₉—NH₂
Nonamethylenediamine The said diamines and aromatic triamines or tetraamines, when reacted with the dihalides of the aromatic dicarboxylic acid mentioned below, may be used either in the form of free bases or in the form of inorganic or organic acid salts which do not hinder the reaction of forming the polyamide imines of the invention. When the said diamines and aromatic triamines or tetramines are used in the form of salts, their hydrochlorides, sulfates and toluenesulfonates are, for instance, preferable, and their carboxylates should not be used. As, however, greater quantities of the acid acceptors need be used during the reaction in the case of using their acid salts, than in the case of using their free bases, it is generally more expedient to use them in the form of free bases except when these diamines, triamines and tetramines can be isolated only in the form of acid salts.

AROMATIC DICARBOXYLIC ACID DIHALIDES

As the aromatic dicarboxylic acid dihalides (C) of the invention to be reacted with the aromatic triamines or tetramines (A) or mixtures of at least 50 mol percent of said aromatic triamines or tetramines with not more than 50 mol percent of the diamines (B), compounds of the following formula can be mentioned:

$$\text{Hal} \cdot \text{OC—A—CO} \cdot \text{Hal} \quad (7)$$

wherein Hal represents a halogen atom;
A is a divalent aromatic group; and,
two —COHal groups should not be at the ortho- or peri-positions of the aromatic group A.

In the above Formula 7, a p-phenylene group, m-phenylene group and symmetrical naphthylene group are particularly preferable as A, and a chlorine atom is particularly preferable as Hal.

Specific examples of such aromatic dicarboxylic acid dihalide are as follows:

(301) 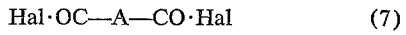
Terephthaloyl chloride (302) 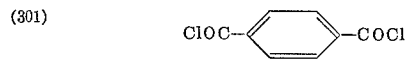
Isophthaloyl chloride (303) 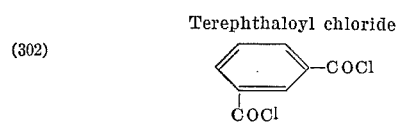
5-Chloro-isophthaloyl chloride (304) 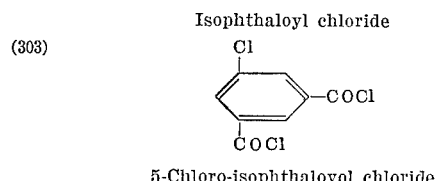
2-Chloro-terephthaloyl chloride (305) 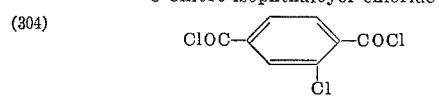
2,5-Dichloro-terephthaloyl-chloride (306) 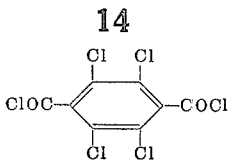
Tetrachloro-terephthaloyl chloride (307) 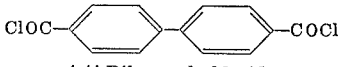
4,4'-Dibenzoyl chloride (308) 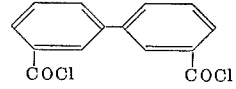
3,3'-Dibenzoyl chloride (309) 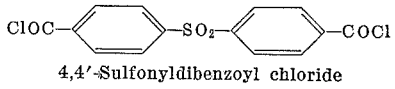
4,4'-Sulfonyldibenzoyl chloride (310) 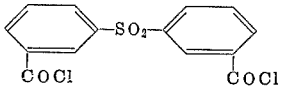
3,3'-Sulfonyldibenzoyl chloride (311) 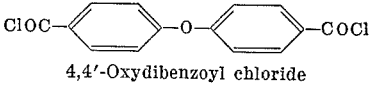
4,4'-Oxydibenzoyl chloride (312) 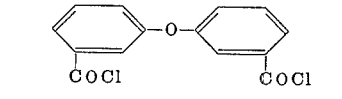
3,3'-Oxydibenzoyl chloride (313) 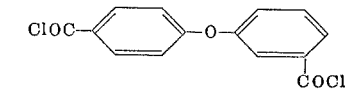
3,4'-Oxydibenzoyl chloride (314) 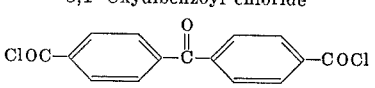
4,4'-Benzophenonedicarbonyl chloride (315) 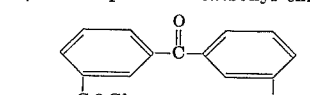
3,3'-Benzophenonedicarbonyl chloride (316) 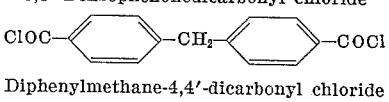
Diphenylmethane-4,4'-dicarbonyl chloride (317) 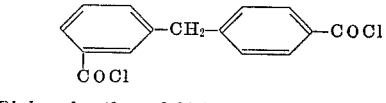
Diphenylmethane-3,3'-dicarbonyl chloride (318) 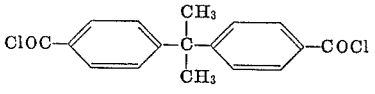
2,2-Bis(p-chlorocarbonylphenyl)propane (319) 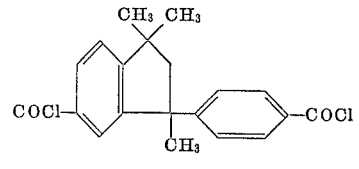
1,1,3-Trimethyl-5-chlorocarbonyl-3-(p-chlorocarbonylphenyl)indane (320) 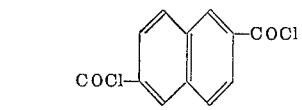
Naphthalene-2,6-dicarbonyl chloride

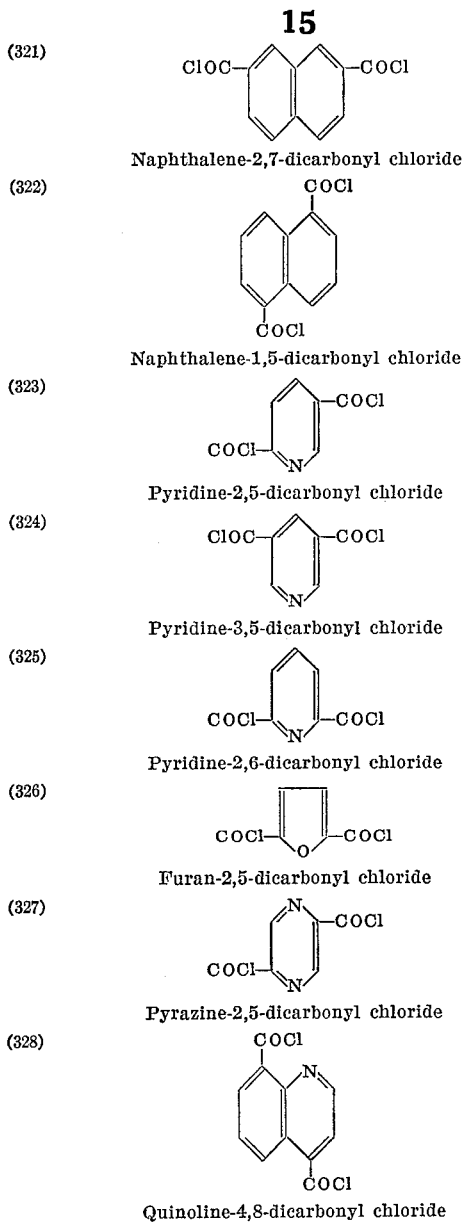

(321) Naphthalene-2,7-dicarbonyl chloride
(322) Naphthalene-1,5-dicarbonyl chloride
(323) Pyridine-2,5-dicarbonyl chloride
(324) Pyridine-3,5-dicarbonyl chloride
(325) Pyridine-2,6-dicarbonyl chloride
(326) Furan-2,5-dicarbonyl chloride
(327) Pyrazine-2,5-dicarbonyl chloride
(328) Quinoline-4,8-dicarbonyl chloride

PROCESS FOR PREPARATION OF AROMATIC POLYAMIDE IMINES

According to the invention, the polyamide imines are prepared by reacting the aromatic triamines or tetramines (A) or mixtures of at least 50 mol percent of the aromatic triamines or tetramines (A) with 50 mol percent or less of the diamines (B), with the aromatic dicarboxylic acid dihalides (C) in an inert organic liquid medium. In this reaction, it is not necessary that each of the reactants (A), (B) and (C) should be singular. For instance, two aromatic triamines or tetramines (A) may be reacted with the reactant (C) with or without the use of the reactant (B). Or, at least two of the reactant (B) and/or reactant (C) may be reacted with one of the reactants (A) or at least two of said reactants (A).

As the inert organic liquid medium, any inert organic solvent may be used so long as it dissolves at least one, preferably both, of the aromatic triamine or tetramine (A) and aromatic dicarboxylic acid dihalide (C), and dissolves, or at least swells, a polymer to a degree such that the partially formed polymer is maintained in an active condition until the reaction completely proceeds and gives a desired high molecular-weight polymer. The "inert" means that the solvent is substantially non-reactive in the reaction of forming the polyamide imine of the invention.

It is preferable to take into consideration a reaction method employed in the formation of the intended polyamide imine when determining what compound is specifically employed as the inert organic liquid medium.

Examples of the reaction methods that can be employed in the invention are:

(1) A method in which reaction is carried out in the presence of an organic acid acceptor under substantially anhydrous conditions; and (2) A method in which reaction is carried out in the presence of an aqueous solution of an acid acceptor.

In the polymerization reaction under substantially anhydrous conditions (1), both the inert organic liquid medium and the organic acid acceptor are used when the inert organic liquid medium itself has no ability as the acid acceptor (a); or when the inert organic liquid medium itself has an ability as the acid acceptor, it concurrently acts as the acid acceptor (b). In the case of (a), the inert organic liquid medium should be one which dissolves the organic acid acceptor. As the inert organic liquid of this type, the following compounds can be cited as examples: halogen-substituted non-aromatic hydrocarbons in which at least one hydrogen atom is attached to the carbon atom bonded to a halogen atom, such as chloroform, methylene chloride, 1,1,2-trichloroethane, 1,2-dichloroethane, chlorobromomethane, s-tetrachloroethane and cis-1,2-dichloroethane, cyclic methylene sulfones such as tetramethylene sulfone and 2,4-dimethyltetramethylene sulfone, methyl ethyl ketone, tetrahydrofuran, acetonitrile, propionitrile, diethyl cyanamide, dimethyl cyanamide, and mixtures of these, tetrahydrofuran being particularly suitable.

Any compound is usable as the organic acid acceptor usable with the inert organic liquid medium so long as it is capable of reacting with an acid (hydrogen halide) formed during the polymerization reaction, and is a basic substance which tends more to react with the said acid (hydrogen halide) than with the aromatic triamines or tetramines as reactants and does not substantially react with the aromatic dicarboxylic acid dihalide which is one of the reactants of the invention. Such basic substances (acid acceptor) include organic tertiary amines such as trimethyl amine, triethyl amine, N-ethyl piperidine, N-methyl morpholine, N-ethyl morpholine, N,N-dimethylbenzyl amine and N,N-diethylbenzylamine, and polyfunctional tertiary amines such as N,N,N',N'-tetramethylhexamethylene diamine.

As the inert organic liquid medium which can concurrently act as the acid acceptor (b), we can mention amide-type organic compounds such as N,N-dimethylacetamide, N,N - diethyl acetamide, N,N - dimethylpropionamide, N,N-dimethylbutyramide, 1 - methyl - 2 - pyrrolidone, 1,5 - dimethyl - 2 - pyrrolidone, 1-ethyl-2-pyrrolidone, N,N,N',N'-tetramethyl urea, N-acetyl pyrrolidine and hexamethyl phosphoramide, and mixtures of these. If these solvents have an insufficient acid-acceptability, other acid acceptors such as organic tertiary amines as mentioned above are sometimes added further.

Better results may sometimes be obtained by adding to the organic solvent a small amount of alkali or alkaline earth metal such as lithium chloride, lithium bromide and calcium chloride.

When the polymerization reaction is carried out in the presence of an aqueous solution of an acid acceptor, it is necessary to use an inert organic liquid medium which is partially miscible with water. Examples of such inert liquid medium are cyclic non-aromatic oxygenated organic solvents, for instance, cyclic sulfones such as cyclic tetramethylene sulfone and 2,4-dimethyl cyclic tetramethylene sulfone, cyclic ketones such as cyclohexanone and cyclopentanone, and cyclic ethers such as tetrahydrofuran and propylene oxide, lower aliphatic ketones such as methyl ethyl ketone and acetone, and mixtures of these.

Furthermore, in the polycondensation reaction of the type (2), a suitable neutral salt may be added to an aqueous phase besides the acid acceptor in order to properly restrain the miscibility of the inert organic liquid medium with water. The usable acid acceptors and neutral salts are as follows:

Preferable are hydroxides of alkali metals such as lithium hydroxide, sodium hydroxide and potassium hydroxide and carbonates or bicarbonates of alkali metals such as sodium carbonate and sodium bicarbonate. Hydroxides, carbonates or bicarbonates of alkaline earth metals such as magnesium hydroxide, magnesium carbonate and calcium bicarbonate are also usable either alone or, if necessary, together with the carbonate or bicarbonate of alkali metal. It is also possible to use water-soluble organic tertiary amines such as triethylamine.

It is preferable that these acid acceptors should be used in amounts sufficient to react with a total amount of an acid (hydrogen halide) generated by the reaction.

As the neutral salts, there are used inorganic salts having a large solubility in water and being non-reactive with the reactants. Preferable are alkali metal halides such as sodium chloride, potassium chloride and lithium chloride. Sulfates and nitrates of the metal are also usable, but it is preferable to use the same salt as that generated as a result of the reaction. The use of such neutral salt is especially effective when such a reaction medium as acetone which has a very large hydrophilicity is used, and it is possible to obtain a polymer having a higher molecular weight than in the absence of the neutral salt.

Now, the reaction conditions will be described.

According to the polycondensation method (1), a solution is prepared by adding the aromatic triamine or tetramine (A) and, if necessary, the acid acceptor and/or other additive. The aromatic triamine or tetramine (A) may be used in the form of its acid salt if necessary. If this case the acid salt should be converted to a free form in the solution by adding a calculated amount of an acid acceptor. The solution is cooled, preferably to 0° to —20° C., and a dicarboxylic acid halide itself or in the form of a solution in a reaction medium is added to the cooled solution. The reaction mixture is agitated until the polycondensation is completed. The reaction temperature is preferably in the range of 0 to 50° C. The time required to complete the reaction varies depending on the type of the starting materials, the type of the reaction solvent and the reaction temperature, but usually 0.5 to 8 hours. A polymer is separated by pouring a reaction mixture into a non-solvent. If the polymer exists as a homogeneous solution at the end of the reaction, it can be utilized directly as a polymer solution for shaping purposes.

The polycondensation method (2) is typically practised by adding a solution of an aromatic dicarboxylic acid halide (C) in an inert organic solvent to a solution consisting of an aromatic triamine or tetramine (A), an organic solvent, an acid acceptor and water and, if necessary an emulsifier or a neutral salt, and agitating the mixture rapidly. The aromatic triamine or tetramine (A) may be used in the form of its acid salt, if necessary. In this case the acid salt should be converted to a free form in the solution by adding a calculated amount of the acid acceptor. The reaction is carried out preferably at a temperature not higher than 50° C., and is usually completed within about 15 minutes. A polymer is obtained usually in powder form, and can be easily recovered by filtration.

The polycondensation method (2) can be practised by two ways. One way is the typical method mentioned before. The other way consists in mixing a solution in the inert organic solvent of the aromatic triamine or tetramine (A) with a solution in the inert organic solvent of the aromatic dicarboxylic acid dihalide (C) to thereby form a solution or dispersion of an oligomer having reactivity, and then contacting it with an aqueous solution of the acid acceptor to complete the polycondensation.

There is hardly any difference in the properties and degree of polymerization between the polymers (aromatic polyamide imines) obtained by these two methods. This suggests that according to the process of the invention, the aromatic triamine or tetramine (A) and aromatic dicarboxylic acid halide (C) are reacted in the inert organic liquid medium even if an aqueous solution of the acid acceptor is used.

As the aromatic triamine or tetramine (A) of the invention is difficulty soluble in water, it hardly moves into an aqueous phase even if its solution in an inert organic solvent is mixed with an aqueous solution of the acid acceptor. These facts indicate that the reaction of the invention of forming an aromatic polyamide imine from an aromatic triamine or tetramine (A) and an aromatic dicarboxylic acid dihalide (C) quite differs in aspect from the known interfacial polycondensation of an aromatic diamine and an organic dicarboxylic acid dihalide. According to the known interfacial polycondensation method, the aromatic diamine is polymerized in an interface transient from an aqueous phase containing the acid acceptor dissolved therein to an organic solvent phase. Therefore, the molecular weight of an obtained polymer was largely affected by such factors as the rate of agitation of the reaction system, concentration of a reaction solution and the basicity of an acid acceptor. In the present invention, however, the molecular weight of the aromatic polyamide imine is hardly affected by these factors even if the polymerization is carried out in the same way as the said known interfacial polycondensation method. This is one of the very unique characteristics of the process of the invention.

In the polycondensation of the types (1) and (2), an aromatic polyamide imine modified with an aromatic diamine can be obtained by mixing a predetermined amount of an aromatic diamine (B) with an aromatic triamine or tetramine (A), and carrying out the polycondensation under the same conditions as above.

Furthermore, in the polycondensation reaction of the invention, some agents for regulating the molecular weights of the polyamide imines may be added to a reaction system in small amounts. The regulators preferably include, monofunctional aromatic amines and carbonyl chlorides such as aniline toluidine, p-chloroaniline, m-chloroaniline, benzoic acid chloride, p-toluoyl chloride and p- or m-chlorobenzoyl chloride. Any monofunctional aromatic compound may be used so long as it has a primary amino group or carbonyl halide group with a reactivity equivalent to that of a primary amino group of the aromatic triamine or tetramine (A) or carbonyl halide of the aromatic dicarboxylic acid dihalide, and does not substantially hinder the intended condensation reaction.

AROMATIC POLYAMIDE IMINES

According to the invention, the above-mentioned polycondensation leads to the formation of an aromatic polyamide imine wherein at least 50 mol percent of the entire structural unit is composed of at least one aromatic amide imine unit expressed by the following general formula

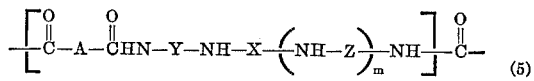

(5)

wherein Y and Z may be the same or different and each represent an ortho-oriented divalent aromatic group; X represents a divalent aromatic group other than those ortho- and peri-oriented; A represents at least one divalent aromatic group; the two

groups should be at positions other than the ortho- and peri-positions of said aromatic group A; and m is 0 or 1.

If a compound of the Formula 10 is used as the aromatic triamine or tetramine of the invention, an aromatic polyamide imine wherein at least 50 mol percent of the entire structural unit is composed of at least one aromatic amide imine unit expressed by the following formula

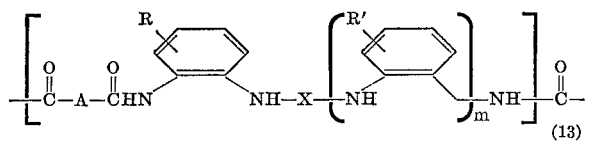

wherein X represents a divalent aromatic group other than those ortho- and peri-oriented which is selected from the group consisting of a benzene nucleus, biphenyl nucleus, naphthalene nucleus, and an aromatic group expressed by the formula

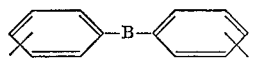

wherein B is an alkylene group having 1–3 carbon atoms, —O—, —SO$_2$— or

A is at least one divalent aromatic group; two

groups should be at positions other than the ortho- and peri-positions of said aromatic group A; R and R' may be the same or different and each represent a hydrogen atom, a lower aliphatic hydrocarbon group having 1–3 carbon atoms, or either R"O— or R'"OCO—, wherein R" or R'" is a lower alkyl group having 1–3 carbon atoms or a phenyl group; and m is 0 or 1.

The polyamide imine of the invention may be one wherein the entire structural unit is composed of only one structural unit expressed by the Formula 5 or 13, or one wherein the entire structural unit is composed of two or more of the structural unit expressed by the Formula 5 or 13. Furthermore, as mentioned above, when a diamine is used as a modifier in an amount equimolar or less to the triamine or tetramine used as the starting material, the entire structural unit of the obtained polyamide imine consists of at least 50 mol percent of at least one structural unit expressed by the above Formula 5 or 13 and 50 mol percent or less of a structural unit expressed by the following formula

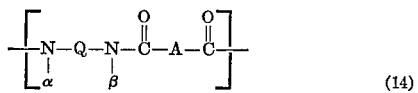

wherein Q is a divalent aromatic group;

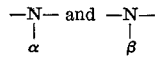

are attached to nuclear carbon atoms at positions other than adjacent and peri positions of the aromatic group Q; α and β may be the same or different and each represent an alkyl group having 1–3 carbon atoms or a hydrogen atom; and A is the same as defined in the Formulae 5 and 13.

When the polyamide imine of the invention consisting of the structural unit of the Formula 5 or 13 is modified with the structural unit expressed by the above Formula 14, if m in the Formula 5 or 13 is 0, the content of the structural unit having the Formula 14 should preferably be not more than 25 mol percent of the entire structural unit, and if m is 1, it should preferably be not more than 40 mole percent.

We have already stated the advantage of modifying the polyamide imine of the invention with the structural unit expressed by the Formula 14. If the structural unit used for the modification exceeds the above-mentioned amount, the resulting polyamine imine is deteriorated in thermal stability and also in a good solubility in organic solvents which is the characteristic property of the polyamide imine of the invention. The amount of the structural unit contained for the modification may therefore be determined appropriately by taking the above merits and demerits into consideration.

Among the so obtained aromatic polyamide imines of the invention are:

(1) As the N-aryl substituted secondary amino group which is in itself reactive is at a position adjacent to the primary amino group, even the use of aromatic triamine or tetramine leads to the formation of the aromatic polyamide imine soluble in N,N-dialkyl amides and N-alkyl cyclic amides such as N,N-dimethyl acetamide, N,N-dimethyl formanide and 1-methyl-2-pyrrolidone. The aromatic polyamide imines of the invention are also soluble in tetramethyl urea, hexamethyl phosphoramide and dimethyl sulfoxide, and in amides represented by acetamide and cyclic amides represented by epsilon-caprolactam, which are normally solid at room temperature, at a temperature above the melting points of these solvents. Some of polyamide imines are soluble in phenols such as m-cresol and phenol.

Known heat-resistant polymers such as polyheterocyclic compounds and wholly aromatic polyamides usually exhibit only a limited solubility in organic solvents, and it has been extremely difficult to produce stable solutions having a high concentration of the polymers. On the other hand, the aromatic polyamide imines of the invention can be made into stable solutions of high concentration by using the abovementioned organic solvents. Moreover, these solutions can be diluted with other diluents, such as acetone, toluene, cyclohexane, benzene and methylene chloride.

(2) Hence, the aromatic polyamide imines of the invention can be used as paints and varnishes by dissolving into the above-mentioned organic solvents, or can be shaped with an easy operation into films, fibers and other articles.

(3) The aromatic polyamide imines of the invention can be easily converted by further thermic and/or chemical treatment into thermally and chemically stable N-aryl substituted polybenzimidazoles. The so obtained polybenzimidazoles are usually soluble in proper organic solvents.

PROCESS FOR PREPARATION OF N-ARYL SUBSTITUTED POLYBENZIMIDAZOLES

The aromatic polyamide imines of the invention can be converted into N-aryl substituted polybenzimidazoles by subjecting them to a thermic or chemical treatment, thereby inducing a cyclo-dehydration reaction. It is preferable generally that the above cyclo-dehydration reaction should be induced by heating. When the cyclo-dehydration reaction is induced only by heating, the reaction can be carried out at a temperature above 200° C. but below a point at which the decomposition of the resulting polybenzimidazoles takes place to a degree such as to cause substantial inconveniences. Generally, however, it is preferable that the reaction should be carried out at a temperature from 200°–600° C., particularly 250° to 500° C. If, however, an acidic substance is conjointly used in heating, the cyclo-dehydration reaction is promoted, and even if the heating temperature is lower, for instance, 60° C., it is possible to induce the cyclo-dehydration reaction satisfactorily. Therefore, if an acidic substance is conjointly used in the cyclodehydration reaction, the heating temperature may be above 60° C. but below a temperature at which the decomposition of the above-mentioned polybenzimidazole takes place to a degree such as to involve disadvantages. Generally, however, a temperature between 60–300° C., particularly 80–200° C. is suitable.

The proceeding of a cyclo-dehydration is, in general, affected by the heating temperature and heating time. If, therefore, the heating temperature is high, the heating time may be short, or vice versa. Any acidic substance is usable in the invention so long as it does not substantially cause side-reactions during the cyclo-dehydration reaction. But especially preferable are those acidic substances which have a function of catching water formed in the cyclo-dehydration reaction, namely dehydration action. Examples are inorganic or organic acids such as hydrochloric acid, phosphoric acid, polyphosphoric acid, p-toluenesulfonic acid, oxalic acid, formic acid, dichloroacetic acid and trifluoroacetic acid. The amount of such acidic substance to be added may be about 0.001–15% by weight based on the polyamide imine, but the upper limit is not necessarily restricted to 15% by weight.

As mentioned before, the aromatic polyamide imines of the invention can be converted into polybenzimidazoles by cyclo-dehydrating them using a chemical treatment alone.

Cyclo-dehydration to convert the polyamide imine of the present invention into polybenzimidazole can be very effectively conducted if the reaction system contains the said acidic substance and an organic solvent which is capable of swelling, especially dissolving, both of the said polyamide imine and polybenzimidazole.

In the present specification and claims, the polybenzimidazoles mean those resulting from conversion by the cyclo-dehydration of at least 50 mol percent of the aromatic amide imine structural units expressed by the Formula 5 and 13 into a benzimidazole ring. Hence, it is not always necessary that the polybenzimidazole of the invention should be derived from 100% cyclo-dehydration of the polyamide imine.

Thus, according to the invention, N-aryl substituted polybenzimidazoles can be prepared by subjecting polyamide imines in which at least 50 mol percent of the entire structural unit is composed of at least one aromatic amide imine structural unit expressed by the following formula

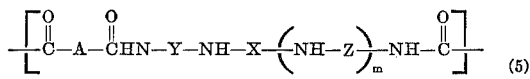
(5)

wherein Y and Z may be the same or different and each represent an ortho-oriented aromatic group; X is a divalent aromatic group other than those ortho- and peri-oriented; A represents at least one divalent aromatic group; the two

groups should be at positions other than the adjacent and peri positions of the aromatic group A; and m is 0 or 1 to a thermic and/or chemical treatment whereby at least 50 mol percent of the above-mentioned aromatic amide imine structural unit is converted into an N-aryl substituted benzimidazole structure expressed by the following formula

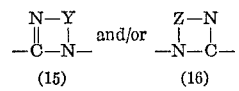
(15)    (16)

wherein Y and Z are as defined above.

Thus, when the aromatic triamine of the Formula 8

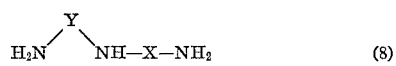
(8)

is used as the aromatic triamine or tetramine expressed by the Formula 6, the cyclo-dehydration in accordance with the present invention gives a polybenzimidazole wherein at least 50 mol percent of the entire structural unit is composed of the structural unit expressed by the Formula 17

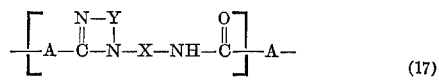
(17)

wherein Y represents an ortho-oriented divalent aromatic group; X is a divalent aromatic group other than those ortho- and peri-oriented; and A represents at least one divalent aromatic group other than those ortho- and peri-oriented.

When the tetramine of the Formula 9

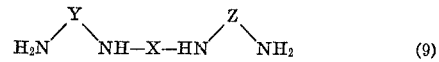
(9)

as the aromatic triamine or tetramine of the Formula 6, the cyclodehydration in accordance with the invention gives a polybenzimidazole wherein at least 50 mol percent of the entire structural unit is composed of the structural unit expressed by the Formula 18

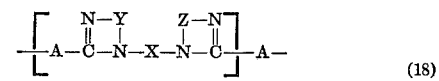
(18)

wherein Y and Z may be the same or different and each represent an ortho-oriented divalent aromatic group; X represents a divalent aromatic group other than those ortho- and peri-oriented; and A represents at least one divalent aromatic group other than those ortho- and peri-oriented.

Furthermore, the polybenzimidazole of the invention may be one wherein the entire structural unit consists of at least 50 mol percent of the structural units (17) and (18) combined. Such a polybenzimidazole can be easily prepared by conjointly using the aromatic triamine and tetramine of the Formulae 8 and 9 at a suitable proportion and cyclo-dehydrating the obtained aromatic polyamide imine.

The polybenzimidazole of the invention, as mentioned above, may be one wherein at least 50 mol percent of the entire structural unit is composed of the structural unit expressed by the Formula 17 or 18, and other structural unit may be a non-cyclic amide imine structural unit expressed by the general Formula 5

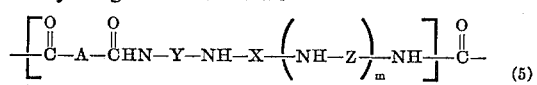
(5)

wherein X, Y, Z, A and m are as defined above, and/or a carbonamide structural unit of the Formula 14

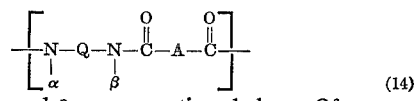
(14)

wherein Q, A, α, and β are as mentioned above. Of course, the polybenzimidazole of the invention may be substantially free from the structural units of the Formulae 5 and 14, and it is permissible that a substantially entire structural unit is composed of the structural units expressed by the Formula 17 and/or Formula 18.

Accordingly, the polybenzimidazole of the invention should preferably be an aromatic polybenzimidazole wherein (1) 50–100 mol percent of the entire structural unit consists of at least one aromatic benzimidazole structural unit expressed by the following formula

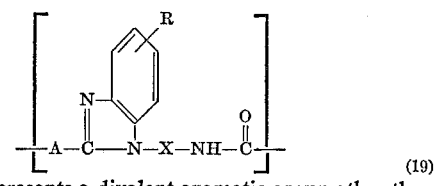
(19)

wherein X represents a divalent aromatic group other than those ortho- and peri-oriented which is selected from the group consisting of a benzene nucleus, biphenyl nucleus, naphthalene nucleus, and an aromatic group expressed by the formula

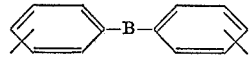

wherein B is an alkylene group having 1–3 carbon atoms, —O—, $SO_2$— or

A represents a divalent aromatic group other than those ortho- and peri-oriented; and R represents a hydrogen atom, a lower aliphatic hydrocarbon group having 1-3 carbon atoms, or either R″O or R‴OCO—, wherein R″ and R‴ each represent a lower alkyl group having 1-3 carbon atoms or a phenyl group, and (2) the remaining 50-0 mol percent of the structural unit consists of an aromatic polyamide structural unit expressed by the following formula

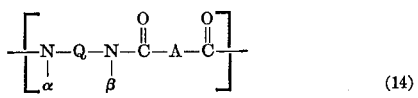
(14)

wherein Q represents a divalent aromatic group;

and

are bonded to nuclear carbon atoms at positions other than the adjacent and peri positions of the aromatic group Q; α and β may be the same or different and each represent an alkyl group having 1-3 carbon atoms or a hydrogen atom. A is the same as defined above.

Another preferable polybenzimidazole of the invention is an aromatic polybenzimidazole wherein (1) 50-100 mol percent of the entire structural unit consists of at least one aromatic benzimidazole structural unit expressed by the following formula

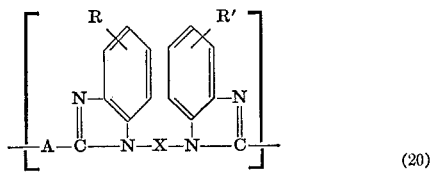
(20)

wherein X represents a divalent aromatic group other than those ortho- and peri-oriented which is selected from the group consisting of a benzene nucleus, biphenyl nucleus, naphthalene nucleus, and an aromatic group expressed by the formula

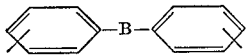

wherein B is an alkylene group having 1-3 carbon atoms, —O—, —SO₂— or

A represents at least one divalent aromatic group other than those ortho- and peri-oriented; and R and R′ may be the same or different and each represent a hydrogen atom, a lower aliphatic hydrocarbon group having 1-3 carbon atoms, or either R″O— or R‴OCO—, wherein R″ and R‴ each represents a lower alkyl group having 1-3 carbon atoms or a phenyl group, and (2) the remaining 50-0 mol percent of the structural unit consists of an aromatic polyamide structural unit expressed by the following formula

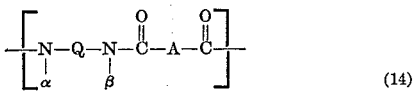
(14)

wherein Q represents a divalent aromatic group

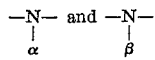

are bonded to nuclear carbon atoms at positions other than the adjacent and peri positions of the aromatic group Q; α and β may be the same or different and each represent an alkyl group having 1-3 carbon atoms or a hydrogen atom. A is the same as defined above.

As a matter of course, the above-mentioned polybenzimidazole may contain a small amount, for instance, not more than 30 mol percent of the non-cyclic amide imine structural unit expressed by the above Formula 13, based on the entire structural unit. As expressed by the above Formulae 17, 18, 19 and 20 or the Formulae 15 and 16, the polybenzimidazole of the invention is introduced into the main chain at the 1- and 2-positions of the benzimidazole nucleus. The polybenzimidazole of such a structure has not been known heretofore.

The actual operation of the cyclo-dehydration of the invention will be carried out in the following manner.

The polyamide imines of the invention can be subjected to heat cyclo-dehydration in the form of powder, flake, irregularly crushed particles, or solids shaped from the polyamine imine solutions such as films, fibers, coating and other shaped articles. As a heating medium, both liquid and gas can be used so long as they are inert to the aromatic polyamide imines and do not dissolve them. Generally preferable are air, inert gases such as nitrogen and carbon dioxide gas and liquid mediums such as Dowtherm and silicone.

If it is desired to dissolve the obtained polybenzimidazole into an organic solvent, it is preferable that the heat cyclization should be carried out in a condition free from air, such as in an inert gas or under vacuum. It is also possible to cycle-dehydrate the aromatic polyamide imine in the form of its solution in an organic solvent, and thus convert it into a polybenzimidazole. In this case, the use of an acidic catalyst is preferable. For instance, a solution of the polybenzimidazole can be obtained by using a solvent for both the aromatic polyamide imine and polybenzimidazole and a small amount of an acidic catalyst such as hydrochloric acid and p-toluenesulfonic acid, and heating at a temperature above 60° C., preferably a temperature in the range of 80° C. to the boiling point of the solvent.

Furthermore, when a solid aromatic polyamide imine or a solution of it in an inert organic solvent is added to such an acidic solvent as formic acid, dichloroacetic acid and trifluoroacetic acid in which the polybenzimidazole of the invention is soluble, and the mixture is heated and cyclodehydrated, a resulting polybenzimidazole is gradually dissolved in said acidic solvent with the progress of the cyclo-dehydration reaction, and the polybenzimidazole can be obtained in the form of solution. When the cyclo-dehydration reaction is carried out in a solution, water formed as by-product tends to induce the hydrolysis of the polyamide imine. It is therefore preferable that the heating conditions for the cyclo-dehydration reaction should be relatively mild.

According to the invention, a shaped article of properly cyclized polybenzimidazole can be obtained by heating a solution of the aromatic polyamide imine while shaping it (for instance, shaping into films by a casting method), and after shaping, the shaped article may further be subjected to the cyclo-dehydration. As a matter of course, the cyclo-dehydration reaction can be promoted by adding a suitable acidic substance.

The N-aryl substituted polybenzimidazoles of the invention are excellent in heat resistance, being durable to a long time use at 200° C. for instance, good in resistance to an oxidizing atmosphere and stable to various chemicals such as acids or alkalies, and can be shaped into articles having extremely excellent mechanical and electrical characteristics. Shaped articles from the polybenzimidazoles of the invention are useful as coatings, films, fibers and other articles.

Most of the N-aryl substituted polybenzimidazoles of the invention are soluble in formic acid or dichloroacetic acid. Some of them are even soluble in m-cresol, dimethyl sulfoxide, N-methyl-2-pyrrolidone or N,N-dimethyl acetamide. Moreover, some of them melt above 300° C. For this reason, they are easily shaped into various articles.

Incidentially, the structures of the aromatic polyamide imines and N-aryl substituted polybenzimidazoles of the invention which are expressed by the above general formulas have been confirmed by elemental analyses or infrared absorption spectra as shown in the examples which follow.

Hereinafter the invention will be explained in further details, with reference to the examples which are not to be considered as limiting the scope of the invention in any way, but are given exclusively for illustrative purpose.

In the examples, inherent viscosities ($\eta_{inh}$) are those measured at 30° C., which are determined in accordance with the following formula:

$$\eta_{inh} = \frac{\ln \eta_{rel}}{C}$$

The relative viscosity ($\eta_{rel}$) may be determined by dividing the flow time in an Ostwald viscometer of a dilute solution of the polymer by the flow time for the pure solvent. In the formula above, C stands for the polymer concentration, expressed by gram numbers of the polymer weight in 100 ml. of the solvent.

Unless otherwise specified, the inherent viscosities given in the examples were determined as to dimethylformamide solution of the polymers at a concentration of 0.5 g./100 ml.

The thermal gravimetric analysis was performed at the rate of temperature rise of 5°/min. in the air.

Control

In a three-necked flask of 50 ml. capacity equipped with a sealed stirrer and calcium chloride drying tube, 10 ml. of N-methyl-2-pyrrolidone and 0.995 g. (0.005 mol) of 4,4'-diaminodiphenylamine were mixed by stirring and converted to a homogeneous solution. The solution was cooled with ice from outside, and to which 1.015 g. (0.005 mol) of isophthaloyl chloride was added under stirring. Approximately 15 minutes thereafter gelation of the system took place, and the resultant polymer was cross-linked and solvent-insoluble.

Example 1

A solution consisting of 2.72 g. (0.01 mol) of 2,4'-diaminodiphenylamine dihydrochloride, 4.24 g. (0.04 mol) of sodium carbonate, 50 ml. of water and 42 ml. of tetrahydrofuran was put into a whirling blender, and rapidly agitated. Into the resultant mixture a solution consisting of 2.03 g. (0.01 mol) of terephthaloyl chloride and 17 ml. of tetrahydrofuran was added, and reacted by continuing the agitation for 10 minutes. The reaction was carried out at room temperature, and at the end of the reaction, the precipitation of a polymer was made complete by addition of a large amount of water. Filtration, washing and drying procedures gave a polymer in yellow powdery form almost quantitatively. This polymer was found to have an inherent viscosity of 0.77, and was soluble in an organic solvent such as dimethyl formamide, N,N-dimethyl acetamide, N-methyl-2-pyrrolidone and dimethyl sulfoxide at a high concentration. A tough yellow, transparent film could be shaped from such a solution. According to the observation of the polymer on a hot plate, it was not softened at a temperature below 350° C. The thermogravimetric analysis of the polymer showed a weight loss by cyclo-dehydration at a temperature in the vicinity of 250° C., but thereafter, it exhibits almost no weight loss up to a temperature 430° C., retaining 76% of the initial weight even at 550° C.

The infrared absorption bands were observed at 3300 cm.$^{-1}$ by —NH— group, and at 1650 cm.$^{-1}$ and 1510–1530 cm.$^{-1}$ by

group. The elemental analysis values as found were C: 70.95%, H: 5.21%, and N: 12.15%, which corresponded substantially with the calculated values (C: 72.93%, H: 4.59%, N: 12.76%). It could be confirmed from these data that the obtained polymer has a polyamide imine structure.

This polymer in powdery form was heated at 300° C. for 6 hours under reduced pressure to cyclo-dehydrate it. The polymer after that treatment hardly changed in appearance, except a slight fading of the color. The resulting cyclized polymer had an inherent viscosity of 0.63 measured in a sulfuric acid solution. It was insoluble in the amide-type solvents and dimethyl sulfoxide, but soluble in formic acid, dichloroacetic acid and m-cresol. A solution of it in such solvent gives a film. According to the infrared absorption spectrum, a characteristic absorption of the amide group decreased, and a characteristic absorption of N-aryl substituted benzimidazole showed itself strongly at 1380 cm.$^{-1}$. In order to known the degree of cyclization, the polyamide imine was dissolved in 116% polyphosphoric acid and heated thereby to prepare a standard sample of polyamide benzimidazole which was considered to be completely cyclized as described in Example 45. The polyamidebenzimidazole of the present example and the standard sample given in Example 45 were compared in infrared absorption spectrum and found to be in good agreement with each other in view of both absorption bands and their relative intensities. It was found therefore that the cyclization of the polyamide imine by heating was almost complete under the conditions of the present example. The thermogravimetric analysis of the cyclized polymer indicated that there was no weight loss by cyclo-dehydration at a temperature in the vicinity of 250° C. which was observed in the polyamide imine before cyclization, and there is hardly any weight loss up to 430° C., retaining 70% of the initial weight even at 600° C. This is indicative of an excellent thermal stability of the polyamide benzimidazole obtained above.

Example 2

In a 100 ml. three-necked flask equipped with a sealed stirrer and a calcium chloride tube, 2,72 g. (0.01 mol) of 2,4'-diaminodiphenylamine dihydrochloride was suspended in 25 ml. of N-methyl-2-pyrrolidone, followed by the addition of 2.02 g. (0.02 mol) of triethylamine. While cooling the resultant mixture with ice from outside, 2.03 g. (0.01 mol) of terephthaloyl chloride was added under stirring. The system was cooled with ice until the exothermic phenomenon at the initial stage of reaction subsided, and then the reaction was continued at room temperature. After the total reaction time of 5 hours, the reacted solution was transferred into water, and a polymer was separated. The separated polymer was washed thoroughly with a dilute aqueous solution of sodium carbonate, ion-exchange water and methanol, and dried under reduced pressure. There was obtained a yellow polymer quantitatively which had an inherent viscosity of 0.29. The infrared absorption spectrum, solubility and thermic characteristics of the obtained polymer all corresponded with those of the polymer obtained in Example 1.

Example 3

The procedures of Example 1 were repeated except that isophthaloyl chloride was used instead of terephthaloyl chloride. A light yellow polymer having an inherent viscosity of 0.69 was obtained almost quantitatively. The obtained polymer was soluble in a polar organic solvent such as dimethyl formamide, N,N-dimethyl acetamide, N-methyl-2-pyrrolidone and dimethyl sulfoxide at a high concentration, and such a shaped article as film could be obtained from a solution of the polymer in such solvent.

According to the observation of the polymer on a hot plate, it was not softened at a temperature below 350° C. The thermogravimetric analysis of the polymer showed a weight loss by cyclo-dehydration at a temperature in the vicinity of 250° C., but thereafter, it shows almost no weight loss up to a temperature of 420° C. The infrared absorptions of the obtained polymer corresponds well with those of the polymer obtained in Example 1, showing that it has a polyamide imine structure.

Example 4

In a 100 ml. three-necked flask equipped with a sealed stirrer and a calcium chloride tube, 2.90 g. (0.01 mol) of N,N' - bis - (2 - aminophenyl) - p - phenylenediamine was dissolved into 20 ml. of N-methyl-2-pyrrolidone by mixing and stirring. While the resulting solution was being cooled with ice from outside, 2.07 g. (0.0102 mol) of terephthaloyl chloride was added under stirring. The reaction system was cooled until the exothermic phenomenon at the initial stage of reaction subsided, and then the reaction was continued at room temperature. After the total reaction time of 5 hours, the reacted solution was transferred into water, and a polymer was separated. The separated polymer was thoroughly washed with a dilute aqueous solution of sodium carbonate, ion- exchange water and methanol, and dried under reduced pressure. A yellowish orange polymer was obtained quantitatively, which showed an inherent viscosity as measured in N-metyhl-2-pyrrolidone solution of 0.27. The obtained polymer was soluble in such a solvent as N,N'-dimethyl acetamide, N-methyl-2-pyrrolidone and dimethyl sulfoxide, and a film can be shaped from a solution of the polymer in such a solvent. According to the observation of the polymer on a hot plate, it was not softened at a temperature below 350° C. The thermogravimetric analysis of the polymer indicated that there is a weight loss by cyclo-dehydration at a temperature around 250° C., but thereafter, it shows almost no weight loss until the temperature reaches 450° C. A strong characteristic absorption of

was observed at 3300 cm.$^{-1}$, 1660 cm.$^{-1}$, 1510–1530 cm.$^{-1}$, and 1300 cm.$^{-1}$ in the infrared spectrum of the polymer, like the polymer of Example 1. The elemental analysis values as found were C: 72.52%, H: 5.10%, and N: 13.03% which substantially corresponded with the calculated values (C: 74.27%, H: 4.79%, N: 13.33%).

The obtained polymer in an irregularly crushed form was heated for 4 hours at 320° C. under reduced pressure to cyclo-dehydrate it. A red-brown cyclized product was obtained, which showed an inherent viscosity in sulfuric acid solution of 0.23. The product was insoluble in the amide-type solvents, but soluble in formic acid or dichloroacetic acid. Dry-shaping of the polymer from its solution in such a solvent could be conducted. It was found by the infrared absorption spectrum that there remains some characteristic absorption of the amide carbonyl in the neighborhood of 1660 cm.$^{-1}$, but absorption of the amide II and III at 1530 cm.$^{-1}$ and 1300 cm.$^{-1}$ has almost disappeared. Instead, there was a strong characteristic absorption of N-aryl substituted benzimidazole at 1380 cm.$^{-1}$, indicating that the polymer was converted into polybenzimidazole. The thermogravimetric analysis of the heat-treated polymer showed that there was no loss in weight by the cyclodehydration which had been seen in that of the polyamide imine at a temperature around 250° C. and up, and that the polymer showed hardly any decrease in weight at a temperature up to 500° C., retaining 70% of the initial weight even at 640° C. This is indicative of an excellent thermal stability.

Example 5

A solution consisting of 2.90 g. (0.01 mol) of N,N'-bis - (2 - aminophenyl) - p - phenylenediamine, 2.12 g. (0.02 mol) of sodium carbonate, 40 ml. of tetrahydrofuran and 50 ml. of water was put into a Waring Blendor, and rapidly agitated, followed by addition of a solution consisting of 2.03 g. (0.01 mol) of terephthaloyl chloride and 17 ml. of tetrahydrofuran. The agitation was continued for 10 minutes to effect the reaction. The reaction was carried out at room temperature, and at the end of the reaction, the precipitation of a polymer was made complete by addition of a large amount water. Filtration, washing and drying procedures gave a yellowish orange polymer almost quantitatively. This polymer had an inherent viscosity of 0.38 measured in its sulfuric acid solution, and was soluble in dimethyl sulfoxide, N-methyl-2-pyrrolidone, N,N-dimethyl acetamide and dimethyl formamide containing lithium chloride.

The infrared absorption spectrum and results of the thermogravimetric analysis of this polymer were the same as those of the polyamine imine obtained in Example 4.

Example 6

The procedures of Example 2 were repeated except that isophthaloyl chloride was used instead of terephthaloyl cholride. A light yellow polymer was obtained almost quantitatively, which showed an inherent viscosity of 0.47 in a concentrated sulfuric acid solution. The polymer was soluble in dimethyl sulfoxide, N-methyl-2-pyrrolidone, N,N-dimethyl acetamide and dimethyl formamide containing lithium chloride, and shaped articles could be prepared from solution of the polymer in these solvents.

The obtained polymer was not softened at a temperature below 350° C. The thermogravimetric analysis of the polymer indicated that an appreciable decrease in weight owing to the cyclo-dehydration could be found at a temperature in the vicinity of 250° C., but thereafter, almost no decrease in weight was seen at a temperature up to 480° C., showing an excellent thermal stability.

The infrared absorption spectrum of the polymer corresponded with that of the polyamide imine obtained in Example 4 in respect of the characteristic absorption of the amide group, and it was seen that the polymer has a polyamide imine structure.

Examples 7–11

The procedures of Example 1 were repeated except that a combination of the triamine dihydrochloride and the dicarbonyl chloride was changed as indicated in Table 1. In each example, a powdery polymer ranging from light yellow to yellow was obtained quantitatively. The inherent viscosity of each polymer obtained is also given in Table 1. All of the obtained polymers were soluble in such a solvent as N-methylpyrrolidone, N,N-dimethyl acetamide, dimethyl formamide and dimethyl sulfoxide, and had an excellent film-forming ability.

The infrared absorption spectrum of the polymer showed a strong characteristic absorption of the amide group, and the thermogravimetric analysis indicated a decrease in weight at a temperature in the vicinity of 250° C. and up owing to the cyclo-dehydration. It is seen from this that the polymers obtained in these examples has a polyamide imine structure.

TABLE 1

| Example number | Aromatic triamine dihydrochlorides | Aromatic dicarbonyl chlorides | Inherent viscosity of the obtained polymers $\eta_{inh}$ |
|---|---|---|---|
| 7 | 2,4'-diaminodiphenylamine. | 2,6-naphthalenedicarbonyl chloride. | 0.75 |
| 8 | do | Isocynchomeronyl chloride. | 0.61 |
| 9 | 4-methyl-2,4'-diaminodiphenylamine. | Terephthaloyl chloride. | 0.58 |
| 10 | 4'-methyl-2,3'-diamino diphenylamine. | do | 0.39 |
| 11 | 1-(2-aminoanilino)-4-aminonaphthalene. | do | 0.48 |

Examples 12–22

The procedures of Example 1 were repeated except that part of the 2,4'-diaminodiphenylamine dihydrochloride (2,4'-DADPA·2HCl) was replaced by other aromatic triamine or aromatic diamine, and part of the terephthaloyl chloride was replaced by other aromatic dicarbonyl chloride as indicated in Table 2 below. A powdery polymer ranging from light yellow to yellow was obtained in each example quantitatively. The intrinsic viscosity of each polymer is shown in Table 2. Each of the polymers was not softened at a temperature below 300° C., as seen from an observation of it on a hot plate. The solubility of each polymer was much the same as that of the homopolymer of Example 1, and it was soluble in such a solvent as N-methyl-2-pyrrolidone, N,N-dimethyl acetamide and dimethyl formamide. A flexible tough film could be shaped from a solution of each polymer in such a solvent.

For example, a film having a thickness of about 40 microns prepared by dry-shaping from a solution of the polyamide imine obtained in Example 13 in dimethyl formamide was found to have a tenacity of 620 kg./cm.$^2$ and an elongation of 12%.

hot plate, the polymer obtained in Example 28 had a softening point of 320–340° C., and the polymer obtained in Example 30 had a softening point of 270–290° C. Other polymers did not show any clear softening point at a temperature below 350° C.

TABLE 3

| Example Number | Amine component | Acid chloride component | Amount of N-MP (ml.) | Inherent viscosity of polymer ($\eta_{inh}$) |
|---|---|---|---|---|
| 23 | 2,4'-diaminodiphenylamine·2HCl | 4,4'-dibenzoyl chloride | 20 | 0.29 |
| 24 | do | 4,4'-sulfonyldibenzoyl chloride | 20 | 0.31 |
| 25 | N,N'-bis(2-aminophenyl)-benzidine | Terephthaloyl chloride | 30 | 0.65 |
| 26 | N-(2-aminophenyl)-benzidine | do | 30 | 0.71 |
| 27 | 1,5-bis(2-aminoanilino)-naphthalene | do | 30 | 0.46 |
| 28 | 4,4'-bis(2-aminoanilino)-diphenylsulfone | do | 25 | 0.55 |
| 29 | 4-(2-aminoanilino)-4'-aminodiphenylsulfone | do | 25 | 0.59 |
| 30 | 4,4'-bis(2-aminoanilino)-diphenylether | do | 20 | 0.58 |

Examples 31–39

The procedures of Example 4 were repeated except that a part of the aromatic tetramine or aromatic triamine was replaced by the aromatic diamine or aliphatic diamine indicated in Table 4 and a part of the terephthaloyl chloride was replaced by isophthaloyl chloride. When a hydrochloride of an amine was used as the starting material, triethylamine in an amount equimolar to the hydrochloric acid content in the amine was offered for reaction in the form of its solution in N-methylpyrrolidone as described in Example 2. The amount of N-methylpyrrolidone used and the inherent viscosities of the polymers obtained are shown in Table 4. The obtained polymers except the polymer obtained in Example 32 were soluble in N-methylpyrrolidone, dimethyl formamide, N,N-dimethylacetamide

TABLE 2

| Example Number | Amount of 2,4'-DADPA·2HCl (mol) | Comonomer | Mol | Acid chloride component | Mol | Inherent viscosity of polymer $\eta_{inh}$ |
|---|---|---|---|---|---|---|
| 12 | 0.008 | 4,4'-diaminodiphenylether | 0.002 | Terephthaloyl chloride | 0.01 | 1.05 |
| 13 | 0.008 | 4,4' diaminodiphenylmethane | 0.002 | do | 0.01 | 0.89 |
| 14 | 0.0075 | 4,4'diaminodiphenylsulfone | 0.0025 | do | 0.01 | 0.67 |
| 15 | 0.006 | 3,3'diaminodiphenylsulfone | 0.004 | do | 0.01 | 0.80 |
| 16 | 0.008 | m-phenylenediamine | 0.002 | do | 0.01 | 0.75 |
| 17 | 0.008 | p-Phenylenediamine | 0.002 | do | 0.01 | 0.84 |
| 18 | 0.009 | N-methyl-p-phenylenediamine | 0.001 | do | 0.01 | 0.58 |
| 19 | 0.008 | 1,5-diaminonaphthalene | 0.002 | do | 0.01 | 0.73 |
| 20 | 0.01 | | | Terephthaloyl chloride / Isophthaloyl chloride | 0.008 / 0.002 | 0.71 |
| 21 | 0.008 | 4-methoxycarbonyl-2,4'-diaminodiphenylamine | 0.002 | Terephthaloyl chloride | 0.01 | 0.58 |
| 22 | 0.008 | 4-methoxy-2,4'-diaminodiphenylamine·2HCl | 0.002 | do | 0.01 | 0.49 |

Examples 23–30

In each example, 0.01 mol of the aromatic triamine or tetramine indicated in Table 3 was reacted with 0.01 mol of the aromatic dicarbonyl dichloride in N-methyl-pyrrolidone (N-MP) in accordance with the procedures of Example 4 to give a polyamide imine. Incidentally, when a hydrochloride of an amine was used as a starting material, triethylamine in an amount equimolar to the hydrochloride acid content in the amine was offered for the reaction in the form of its solution in N-methyl-pyrrolidone as described in Example 2. The amount of the N-methyl-pyrrolidone used, and the inherent viscosity of each of the polymers are given in Table 3. All of the obtained polymers were soluble in such a solvent as N-methyl-pyrrolidone, N,N-dimethylacetamide, dimethyl-formamide and dimethyl sulfoxide, and shaped articles such as film could be prepared from solutions of the polymers in these solvents. According to the observation on a and dimethyl sulfoxide. The polymer of Example 32 was soluble only in N-methylpyrrolidone. Shaped articles such as film could be prepared from solutions of these polymers in such solvents.

When 0.02 mol of terephthaloyl chloride was reacted with 0.005 mol of N,N'-bis(2-aminophenyl)-p-phenylene diamine and 0.015 mol of 4,4'-diaminodiphenyl ether in N-methylpyrrolidone, there was obtained a polymer having an inherent viscosity (measured at 30° C., 0.5 g./100 ml. polymer concentration in conc. H$_2$SO$_4$) of 0.95 which was insoluble in an organic solvent, but soluble only in sulfuric acid.

According to the observation on a hot plate, the polymer obtained in Example 38 had a softening point of 325–340° C., and the polymer obtained in Example 39 had a softening point of 315 to 330° C. All the other polymers obtained did not show a clear softening point at a temperature below 350° C.

TABLE 4

| Example Number | Amine component | | | | Acid chloride component | Mol | Amount of N-MP (ml) | Inherent viscosity of polymer ($\eta_{inh}$) |
|---|---|---|---|---|---|---|---|---|
| | Amount of triamine or tetramine | Mol | Comonomer | Mol | | | | |
| 31 | N,N'-bis(2-aminophenyl)-p-phenylenediamine. | 0.015 | 4,4'-diaminodiphenyl | 0.005 | Terephthaloyl chloride | 0.02 | 40 | 0.59 |
| 32 | ____do____ | 0.010 | ____do____ | 0.010 | ____do____ | 0.02 | 40 | [1] 0.80 |
| 33 | ____do____ | 0.015 | ____do____ | 0.005 | {Terephthaloyl chloride / Isophthaloyl chloride} | {0.015 / 0.005} | 40 | 0.45 |
| 34 | ____do____ | 0.010 | ____do____ | 0.010 | {Terephthaloyl chloride / Isophthaloyl chloride} | {0.015 / 0.005} | 40 | 0.60 |
| 35 | ____do____ | 0.01 | 4,4'-diaminodiphenyl methane. | 0.005 | Tereththaloyl chloride | 0.015 | 30 | 0.65 |
| 36 | ____do____ | 0.01 | 3,3'-diaminodiphenyl sulfone. | 0.005 | ____do____ | 0.015 | 30 | 0.60 |
| 37 | ____do____ | 0.008 | 1,5-naphthalene diamine | 0.002 | ____do____ | 0.01 | 20 | 0.43 |
| 38 | 2,4'-diaminodiphenylamine dihydrochloride. | 0.016 | 4,4'-diaminodicyclohexyl methane. | 0.004 | ____do____ | 0.02 | 60 | 0.40 |
| 39 | ____do____ | 0.016 | Hexamethylenediamine | 0.004 | ____do____ | 0.02 | 50 | 0.28 |

[1] Concentrated ($H_2SO_4$).

Example 40

A tough yellow film was obtained by a dry method from a solution of the polyamide imine of Example 1 in N-methy-2-pyrrolidone. The film was heated for 5 hours at 300° C. under reduced pressure to cyclo-dehydrate it. The film retained its flexibility, and except that the color faded a little, no change was observed in its appearance. According to the infrared absorption spectrum, the characteristic absorption of the amide group decreased, and the characteristic absorption of N-aryl substituted benzimidazole at 1380 cm.$^{-1}$ appeared clearly. Comparison of the relative intensity of the characteristic absorption as in Example 1 indicated that the relative intensity of the characteristic absorpion of the film of the present example corresponds almost completely with that of the standard sample. It is seen from this that the film was almost completely converted to that of polyamidebenzimidazole.

Example 41

The polyamide imine obtained in Example 3 was heated in powdery form for 6 hours at 310° C. to cyclo-dehydrate it. Almost no change was observed in appearance of the treated polymer. But the polymer was only swelled by the amide-type solvents such as dimethyl acetamide and N-methyl-2-pyrrolidone, and was insoluble in them. It was soluble in such a solvent as formic acid, dichloroacetic acid and sulfuric acid almost completely, although remaining partly undissolved. The polymer had an inherent viscosity in sulfuric acid of 0.29.

The infrared absorption spectrum indicated a strong absorption at 1380 cm.$^{-1}$, and it is seen from this that the polyamide imine was converted into polyamidebenzimidazole. The thermogravimetric analysis revealed that there is hardly any decrease in weight at a temperature up to 420° C., and 70% of the initial weight is maintained even at 600° C.

Example 42

A tough yellow film was prepared by a dry method from a solution of the polyamide imine obtained in Example 3 in N-methylpyrrolidone. The film was heated for 5 hours at 310° C. under reduced pressure to cyclo-dehydrate it. The film turned almost colorless, but there is no other change in the appearance. The infrared absorption spectrum indicated the appearance of a characteristic absorption of benzimidazole at 1380 cm.$^{-1}$ in the same degree as in Example 40, and it is seen from this that the film was converted almost completely into that of polyamidezenzimidazole.

Example 43

The polyamide imine obtained in Example 6 was heated in powdery form for 4.5 hours at 330° C. to cyclo-dehydrate it. There was obtained a violet cyclized polymer which was insoluble in the amide-type solvents, but soluble in formic acid. Shaped articles such as film could be prepared from its solution in this solvent. The polymer had an inherent viscosity in sulfuric acid of 0.46. According to the thermogravimetric analysis, there was almost no weight loss at a temperature up to 550° C., indicating an excellent thermal stability.

It is seen from the infrared absorption spectrum that the polyamide imine was converted almost completely into polybenzimidazole as in the case of Example 4.

Example 44

The polyamide imine (0.8 g.) obtained in Example 4 was dissolved by heating in 20 g. of polyphosphoric acid (a total amount of $P_2O_5$ being 84% in a 50 ml. three-necked flask equipped with a sealed stirrer and a calcium chloride tube, and the solution was further heated for 2 hours at 120° C. while stirring. After the end of the reaction, the reaction mixture was transferred into about 0.5 litre of cold water to separate a polymer. After thorough washing with water and an aqueous solution of sodium carbonate, the polymer was filtered and dried. There was obtained a red violet cyclized polymer almost quantitatively.

The obtained polymer was swelled by the above-mentioned amide-type solvents and insoluble in them, but soluble in formic acid and dichloroacetic acid. Shaped articles such as film could be prepared by a dry method from a solution of the polymer in such solvent. The polymer had an inherent viscosity in formic acid of 0.40. According to the infrared absorption spectrum, a characteristic absorption of the amide group disappeared, and a characteristic absorption of N-aryl substituted benzimidazole at 1380 cm.$^{-1}$ appeared strongly. It could be confirmed from this that the polyamide imine was converted into polybenzimidazole almost completely. The measurement by a thermobalance indicated that there is almost no decrease in weight at a temperature up to 500° C., and 70% of the intial weight is retained even at 640° C., showing an excellent thermal stability.

Example 45

The polyamide imine (1 g.) obtained in Example 1 was reacted for 2 hours at 120° C. in a 26 g. of polyphosphoric acid (a total amount of $P_2O_5$ being 84%) to give a light yellow polyamidebenzimidazole. The obtained polyamide benzimidazole was soluble in formic acid, dichloroacetic acid and m-cresol, and shaped articles could be prepared from a solution of the polyamidebenzimidazole in such solvent. It had an intrinsic viscosity in formic acid of 0.53.

Since almost the same cyclization conditions as in Example 44 were employed, the polyamidebenzimidazole obtained in the present example is considered to be completely cyclized. Hence, the infrared absorption spectrum of this polymer was used as a standard spectrum to know the degree of cyclization of polyamidebenzimidazole obtained by other cyclization methods.

Example 46

The polyamide imine (1 g.) obtained in Example 1 was suspended in 10 ml. of a 99% formic acid, and refluxed for about 5 minutes under stirring. The polymer was gradually dissolved, and a homogeneous solution having a red violet color was obtained. The homogeneous solution was cast on a glass plate, and the formic acid was evaporated to give a transparent film. The infrared absorption spectrum of the film corresponded well with that of the polyyamidebenzimidazole obtained in Example 45, indicating that the conversion was completely made. The so obtained polyamidebenzimidazole showed an intrinsic viscosity of 0.71 in formic acid. It had a better solubility than a polyamidebenzimidazole having the same recurring unit which was obtained in the latter half of Example 1 by heat cyclization. It was soluble not only in formic acid dichloroacetic acid and m-cresol, but also in the amide-type solvents such as N-methylpyrrolidone, N,N-dimethyl acetamide and dimethyl formamide.

Examples 47–62

Under the same conditions as in Example 46, the cyclization of each of the polyamide imines indicated in Table 5 was effected with formic acid. In each case, a cyclized polymer was obtained as a homogeneous solution at the end of the reaction, and it could be used directly as a solution for shaping such an article as film. The obtained polybenzimidazoles were soluble in formic acid, dichloroacetic acid, m-cresol and N-methylpyrrolidone. The infrared absorption spectrum revealed that all of the obtained polymer are almost completely cyclized. The inherent viscosity of each of the cyclized polymer in formic acid is also shown in Table 5. According to the observation on a hot plate, the obtained polybenzimidazoles did not show a clear softening point at a temperature below 300° C., except that the polyamide benzimidazole obtained in Example 60 softened at a temperature in the vicinity of 300° C. and the polymer obtained in Example 57 fused at a temperature in the vicinity of 300° C.

TABLE 5

| Example number | Polyamide-imines of Example number | $\eta_{inh}$ of polybenzimidazoles in formic acid |
|---|---|---|
| 47 | 7 | 0.45 |
| 48 | 8 | 0.15 |
| 49 | 10 | 0.30 |
| 50 | 11 | 0.45 |
| 51 | 12 | 0.85 |
| 52 | 14 | 0.55 |
| 53 | 16 | 0.61 |
| 54 | 20 | 0.51 |
| 55 | 21 | 0.51 |
| 56 | 22 | 0.36 |
| 57 | 24 | 0.25 |
| 58 | 28 | 0.56 |
| 59 | 29 | 0.48 |
| 60 | 30 | 0.43 |
| 61 | 33 | 0.54 |
| 62 | 36 | 0.65 |

Examples 63–76

Each of the polyamide imines indicated in Table 6 was cyclized in a mixture of N-methylpyrrolidone and formic acid. In each example, the mixed solvent consisted of 10 parts of N-methylpyrrolidone and 1 part of formic acid, and the polymer was homogeneously dissolved therein at a concentration of 10–15%. The solution was then heated to 130–150° C. and subjected to reaction for 3 hours. The polymer was obtained as a homogeneous solution at the end of the reaction, and could be directly used as a solution for shaping an article such as film. The inherent viscosities of the obtained polybenzimidazoles in N-methylpyrrolidone are concurrently shown in Table 6. The infrared absorption spectrum indicated the decrease or disappearance of a characteristic absorption of the amide group and the appearance of a characteristic absorption of the benzimidazole group in the neighborood of 1380 cm.$^{-1}$, and it can be confirmed from this that all of the polymers are almost completely cyclized. The polybenzimidazoles obtained in these examples, according to the observation on a hot plate, did not show a clear softening point at a temperature below 300° C.

TABLE 6

| Example number | Polyamide imines Example number | $\eta_{inh}$ | Polybenzimidazoles, $\eta_{inh}$ |
|---|---|---|---|
| 63 | 13 | 0.89 | 0.85 |
| 64 | 15 | 0.80 | 0.81 |
| 65 | 17 | 0.84 | 0.73 |
| 66 | 19 | 0.73 | 0.82 |
| 67 | 23 | 0.29 | 0.31 |
| 68 | 25 | 0.65 | 0.53 |
| 69 | 26 | 0.71 | 0.78 |
| 70 | 27 | 0.46 | 0.40 |
| 71 | 31 | 0.59 | 0.42 |
| 72 | 32 | 0.80 | 0.71 |
| 73 | 34 | 0.45 | 0.40 |
| 74 | 35 | 0.65 | 0.52 |
| 75 | 37 | 0.43 | 0.45 |
| 76 | 38 | 0.40 | 0.33 |

We claim:

1. A film-forming aromatic polybenzimidazole wherein (1) 50–100 mol percent of the entire structural unit consists of at least one aromatic benzimidazole structural unit expressed by the following formula

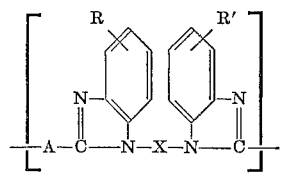

wherein X represents a non-reactive divalent aromatic group other than those ortho- and peri-oriented which is selected from the group consisting of a benzene nucleus, biphenyl nucleus, naphthalene nucleus, and an aromatic group expressed by the formula

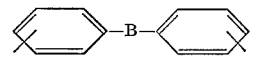

wherein B is an alkylene group having 1–3 carbon atoms, —O—, —SO$_2$— or

A represents at least one non-reactive divalent aromatic group other than those ortho- and peri-oriented; and R and R' may be the same or different and each represent a hydrogen atom, a lower aliphatic hydrocarbon group having 1–3 carbon atoms, or either R″O— or R‴OCO—, wherein R″ and R‴ each represent a lower alkyl group having 1–3 carbon atoms or a phenyl group, and (2) the remaining 50–0 mol percent of the structural unit consists of at least one aromatic polyamide structural unit expressed by the following formula

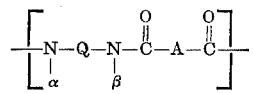

wherein Q represents a divalent aromatic group;

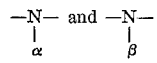

are bonded to nuclear carbon atoms at positions other than the adjacent and peri positions of the aromatic group Q: $\alpha$ and $\beta$ may be the same or different and each represent an alkyl group having 1–3 carbon atoms or a hydrogen atom; and A is the same as defined above.

2. A film-forming aromatic polybenzimidazole wherein (1) 50–100 mol percent of the entire structural unit consists of at least zone aromatic benzimidazole structural unit expressed by the following formula

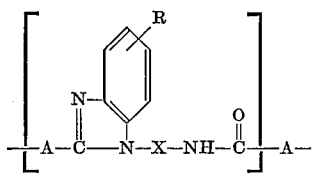

wherein X represents a non-reactive divalent aromatic group other than those ortho- and peri-oriented which is selected from the group consisting of a benzene nucleus, biphenyl nucleus, naphthalene nucleus, and an aromatic group expressed by the formula

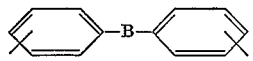

wherein B is an alkylene group having 1–3 carbon atoms, —O—, —SO$_2$— or

A represents at least one non reactive divalent aromatic group other than those ortho- and peri-oriented; and R represents a hydrogen atom, a lower aliphatic hydrocarbon group having 1–3 carbon atoms, or either R″O— or R‴OCO—, wherein R″ and R‴ each represent a lower alkyl group having 1–3 carbon atoms or a phenyl group, and (2) the remaining 50–0 mol percent of the structural unit consists of at least one aromatic polyamide structural unit expressed by the following formula

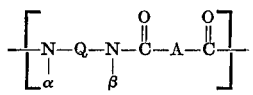

wherein Q represents a non-reactive divalent aromatic group;

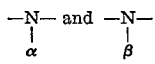

are bonded to nuclear carbon atoms at positions other than the adjacent and peri positions of the aromatic group Q; α and β may be the same or different and each represent an alkyl group having 1–3 carbon atoms or a hydrogen atom; and A is the same as defined above.

3. The film-forming aromatic polyamide imine according to claim 1 wherein the structural unit expressed by the following formula

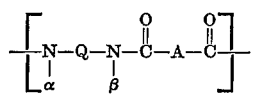

wherein Q, α, β and A are as defined above, is present in an amount of 0–25 mol percent when $m$ defined in claim 2 is 0, and 40–0 mol percent when $m$ defined in claim 2 is 1.

4. A polymer solution for shaping purposes consisting of a solution of the polyamide imine described in claim 3 in an inert organic solvent.

5. A shaped article consisting substantially of the polyamide imine described in claim 4.

6. A polymer solution for shaping purposes consisting of a solution of the polybenzimidazole described in claim 1 in an inert organic solvent.

7. A shaped article consisting substantially of the polybenzimidazole described in claim 6.

8. A film-forming aromatic polyamide imine wherein (1) 50–100 mol percent of the entire structural units is composed of at least one aromatic polyamide imine unit of the formula

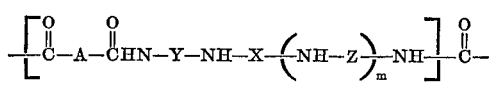

wherein Y and Z may be the same or different and each represent an ortho-oriented non-reactive divalent aromatic group; X is a non-reactive divalent aromatic group other than those ortho- and peri-oriented; A represents at least one non-reactive divalent aromatic group; the two

groups are attached to nuclear carbon atoms at positions other than the ortho- and peri-positions of the aromatic group A; and $m$ is 0 or 1; and (2) the remaining 50–0 mol percent of the structural units is composed of at least one structural unit expressed by the following formula

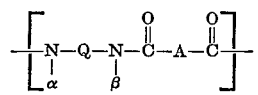

wherein Q is a non-reactive divalent aromatic group;

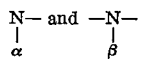

are attached to nuclear carbon atoms at positions other than adjcent and peri-positions of the aromatic group Q; α and β may be the same or different and each represent an alkyl group having 1–3 carbon atoms or a hydrogen atom: and A is the same as defined above.

9. The film-forming aromatic polyamide imine according to claim 7 wherein (1) 50–100 mol percent of the entire structural units is composed of at least one aromatic amide imine structural unit expressed by the formula

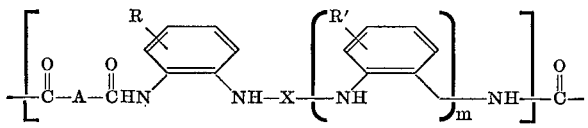

wherein X represents a non-reactive divalent aromatic group other than those ortho- and peri-oriented which is selected from the group consisting of a benzene nucleus, biphenyl nucleus, naphthalene nucleus, and an aromatic group expressed by the formula

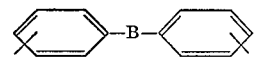

wherein B is an alkylene group having 1–3 carbon atoms, —O—, —SO$_2$— or

A is at least one non-reactive divalent aromatic group; two

groups are attached to nuclear carbon atoms at positions other than the ortho- and peri-positions of said aromatic group A; R and R′ may be the same or different and each represent a hydrogen atom, a lower aliphatic hydrocarbon group having 1–3 carbon atoms, or either R″O— or R‴OCO—, wherein R″ and R‴ each represent a lower alkyl group having 1–3 carbon atoms or a phenyl group; and $m$ is 0 or 1; and (2) the remaining 50–0 mol percent of the structural units is at least one structural unit expressed by the following formula

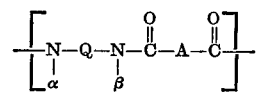

wherein Q is a non-reactive divalent aromatic group;

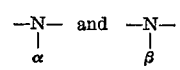

are attached to nuclear carbon atoms at positions other than adjacent and peri-positions of the aromatic group Q; α and β may be the same or different and each represent an alkyl group having 1–3 carbon atoms or a hydrogen atom; and A is the same as defined above.

10. A film-forming polybenzimidazole wherein (1) 50–100 mol percent of the entire structural units is composed of at least one structural unit expressed by the following formula $$\left[-A-\underset{\underset{N}{\overset{N-Y}{\overset{\|}{C}}}}-N-X-\underset{\underset{N}{\overset{Z-N}{\overset{\|}{N}}}}-A-\right]$$

wherein Y and Z may be the same or different and each represent an ortho-oriented non-reactive divalent aromatic group; X is a non-reactive divalent aromatic group other than those ortho- and peri-oriented; and A represents at least one non-reactive divalent aromatic group other than those ortho- and peri-oriented, and (2) the remaining 50–0 mol percent of the structural units is composed of at least one aromatic polyamide structural unit expressed by the following formula $$\left[-\underset{\underset{\alpha}{\overset{}{N}}}-Q-\underset{\underset{\beta}{\overset{}{N}}}-\overset{O}{\overset{\|}{C}}-A-\overset{O}{\overset{\|}{C}}-\right]$$

wherein Q represents a non-reactive divalent aromatic group;

$$-\underset{\alpha}{\overset{}{N}}-$$

and $$-\underset{\beta}{\overset{}{N}}-$$

are bonded to nuclear carbon atoms at positions other than the adjacent and peri-positions of the aromatic group Q; $\alpha$ and $\beta$ may be the same or different and each represent an alkyl group having 1–3 carbon atoms or a hydrogen atom; and A is the same as defined above.

11. A film-forming polybenzimidazole wherein 50–100 mol percent of the entire structural units is composed of at least one structural unit expressed by the following formula $$\left[-A-\underset{\underset{N}{\overset{N-Y}{\overset{\|}{C}}}}-N-X-NH-\overset{O}{\overset{\|}{C}}-\right]-A-$$

wherein Y represents an ortho-oriented non-reactive divalent aromatic group; X represents a non-reactive divalent aromatic group other than those ortho- and peri-oriented, and A represents at least one non-reactive divalent aromatic group other than those ortho- and peri-oriented, and the remaining 50–0 mol percent of the structural units is composed of at least one aromatic polyamide structural unit expressed by the following formula $$\left[-\underset{\underset{\alpha}{\overset{}{N}}}-Q-\underset{\underset{\beta}{\overset{}{N}}}-\overset{O}{\overset{\|}{C}}-A-\overset{O}{\overset{\|}{C}}-\right]$$

wherein Q represents a non-reactive divalent aromatic group;

$$-\underset{\alpha}{\overset{}{N}}-$$

and $$-\underset{\beta}{\overset{}{N}}-$$

are bonded to nuclear carbon atoms at positions other than the adjacent and peri-positions of the aromatic group Q; $\alpha$ and $\beta$ may be the same or different and each represent an alkyl group having 1–3 carbon atoms or hydrogen atom; and A is the same as defined above.

12. A process for preparation of a film-forming polyamide imine, which comprises reacting (a) at least one aromatic triamine or tetramine expressed by the following formula $$H_2N-Y-NH-X-\left(NH-Z\right)_m-NH_2$$

wherein Y and Z may be the same or different and each represent an ortho-oriented non-reactive divalent aromatic group; X represents a non-reactive divalent aromatic group other than those ortho- and peri-oriented; and $m$ is 0 or 1; or (B) a mixture of at least 50 mol percent of the aromatic triamine or tetramine of the above formula and less than 50 mol percent of at least one aromatic diamine, with (C) at least one aromatic dicarbonyl dihalide expressed by the following formula $$Hal \cdot OC-A-CO \cdot Hal$$

wherein Hal represents a halogen atom; A represents a non-reactive divalent aromatic group; and the two $$-CO \cdot Hal$$

groups are attached to nuclear carbon atoms at positions other than at the ortho- and peri-positions of the aromatic nucleus A, at a temperature of $-20°$ C. to $50°$ C. in an inert organic liquid medium in the presence of an acid acceptor.

13. A process for preparation of a film-forming aromatic polyamide imine, which comprises reacting (A) at least one aromatic triamine or tetramine expressed by the following formula wherein X represents a non-reactive divalent aromatic group other than those ortho- and peri-oriented which is selected from the group consisting of a benzene nucleus, biphenyl nucleus, naphthalene nucleus, and an aromatic group expressed by the formula wherein B is in alkylene group having 1–3 carbon atoms, —O—; —SO$_2$— or $$-\overset{O}{\overset{\|}{C}}-$$

R and R' may be the same or different and each represent a hydrogen atom, a lower aliphatic hydrocarbon group having 1–3 carbon atoms, or either R''O— or R'''OCO—, wherein R'' and R''' each represent a lower alkyl group having 1–3 carbon atoms or a phenyl group, or (B) a mixture of at least 50 mol percent of the aromatic triamine or tetramine and less than 50 mol percent of at least one aromatic diamine expressed by the following formula $$\underset{\alpha}{\overset{HN-Q-NH}{\overset{|}{\phantom{X}}\phantom{Q}\overset{|}{\beta}}}$$

wherein Q represents a non-reactive divalent aromatic group;

$$\underset{\alpha}{\overset{HN-}{\overset{|}{\phantom{X}}}}$$

and $$\underset{\beta}{\overset{-NH}{\overset{|}{\phantom{X}}}}$$

are attached to nuclear carbon atoms at positions other than the ortho- or peri-position of the aromatic group Q; $\alpha$ and $b$ may be the same or different and each represent an alkyl group having 1–3 carbon atoms or a hydrogen atom, with (C) at least one aromatic dicarbonyl dihalide expressed by the following formula $$Hal \cdot OC—A—CO \cdot Hal$$

wherein Hal represents a halogen atom; A represents a divalent aromatic group; and the two Hal·CO— groups are attached to nuclear carbon atoms at positions other than the ortho- or peri-position of the aromatic nucleus A, at a temperature of —20° C. to 50° C. in an inert organic liquid medium in the presence of an acid acceptor.

14. A process for preparation of a film-forming polybenzimidazole, which comprises heating an aromatic polyamide imine at a temperature of not less than 200° C. but below the decomposition temperature of the polybenzimidazole to be obtained, or at a temperature of not less than 60° C. but below the decomposition temperature of the polybenzimidazole to be obtained when an acid substance is present, said aromatic polyamide imine being one wherein (1) 50–100 mol percent of the entire structural units is composed of at least one aromatic amide imine structural unit expressed by the following formula

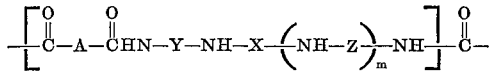

wherein Y and Z may be the same or different and each represent an ortho-oriented non-reactive divalent aromatic group; X represents a non-reactive divalent aromatic group other than those ortho- and peri-oriented; A represents at least one non-reactive divalent aromatic group other than those ortho- and peri-oriented; the two

groups are attached to nuclear carbon atoms at positions other than the ortho- and peri-positions of the aromatic group A; and $m$ is 0 or 1; and (2) the remaining 50–0 mol percent of the structural units is composed of at least one structural unit expressed by the following formula

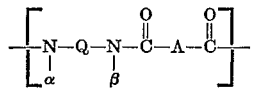

wherein Q is a non-reactive divalent aromatic group;

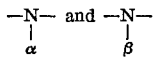

are attached to nuclear carbon atoms at positions other than adjacent and peri-positions of the aromatic group Q;

$\alpha$ and $\beta$ may be the same or different and each represent an alkyl group having 1–3 carbon atoms or a hydrogen atom; and A is the same as defined above; whereby at least 50 mol percent of the aromatic amide imine structural unit having the above general formula is cyclodehydrated and converted into an N-aryl substituted benzimidazole structure expressed by the following formula

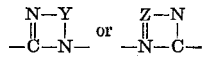

wherein Y and Z are as defined above.

15. A polymer solution for shaping purposes consisting of a solution of the polyamide imine described in claim 9 in an inert organic solvent.

16. A shaped article consisting substantially of the polyamide imine described in claim 9.

17. A polymer solution for shaping purposes consisting of a solution of the polybenzimidazole described in claim 1 in an inert organic solvent.

18. A polymer solution for shaping purposes consisting of a solution of the polybenzimidazole described in claim 11 in an inert organic solvent.

19. A polymer solution for shaping purposes consisting of a solution of the polybenzimidazole described in claim 2 in an inert organic solvent.

20. A shaped article consisting substantially of the polybenzimidazole described in claim 1.

21. A shaped article consisting substantially of the polybenzimidazole described in claim 11.

22. A shaped article consisting substantially of the polybenzimidazole described in claim 2.

References Cited

UNITED STATES PATENTS

| | | | |
|---|---|---|---|
| 2,149,273 | 3/1938 | Carothers | 260—2 |
| 2,483,513 | 10/1949 | Allen et al. | 260—78 |
| 2,895,948 | 7/1959 | Brinker et al. | 260—78.4 |
| 3,174,947 | 3/1965 | Marvel et al. | 260—47 |
| 3,313,783 | 4/1967 | Iwakura et al. | 260—78 |

WILLIAM H. SHORT, Primary Examiner

L. L. LEE, Assistant Examiner

U.S. Cl. X.R.

117—161; 260—30.2, 30.4, 30.6, 30.8; 31.2, 32.4, 32.8, 33.4, 33.8, 65, 78, 78.4

UNITED STATES PATENT OFFICE
CERTIFICATE OF CORRECTION

Patent No. 3,597,391  Dated August 3, 1971

Inventor(s) SHIGEYOSHI HARA ET AL

It is certified that error appears in the above-identified patent and that said Letters Patent are hereby corrected as shown below:

Claim 2, line 3, delete "zone" and substitute --one--

Claim 8, in the first formula the "Y" and "Z" should be raised slightly

Claim 8, formula 4, insert "-" before the first "N"

Claim 12, in the first formula the "Y" and "Z" should be raised slightly

Signed and sealed this 4th day of January 1972.

(SEAL)
Attest:

EDWARD M. FLETCHER, JR.  ROBERT GOTTSCHALK
Attesting Officer  Acting Commissioner of Patents